United States Patent
Kita et al.

(10) Patent No.: US 7,160,031 B2
(45) Date of Patent: Jan. 9, 2007

(54) THRUST DYNAMIC PRESSURE BEARING, SPINDLE MOTOR USING THE SAME, AND INFORMATION RECORDING AND REPRODUCING APPARATUS USING THEM

(75) Inventors: Hiromi Kita, Nara (JP); Shigeo Obata, Hyogo (JP); Kenichi Miyamori, Hyogo (JP); Hiromitsu Noda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 15 days.

(21) Appl. No.: 10/990,486

(22) Filed: Nov. 18, 2004

(65) Prior Publication Data

US 2005/0141789 A1   Jun. 30, 2005

(30) Foreign Application Priority Data

Nov. 20, 2003   (JP)   ............................. 2003-390513

(51) Int. Cl.
  *F16C 32/06*   (2006.01)
(52) U.S. Cl. .................................................. 384/123
(58) Field of Classification Search ................ 384/100, 384/107, 112, 121, 123
  See application file for complete search history.

(56) References Cited

U.S. PATENT DOCUMENTS 5,381,456 A * 1/1995 Vetter et al. ................ 384/123
5,988,886 A * 11/1999 Takahashi .................... 384/107
6,126,320 A * 10/2000 Ichiyama ..................... 384/112
6,316,857 B1 * 11/2001 Jeong .......................... 384/123
6,379,047 B1 * 4/2002 Lee .............................. 384/123

FOREIGN PATENT DOCUMENTS

| JP | 3155529 | 2/2001 |
| JP | 2001-173645 | 6/2001 |
| JP | 2004-112874 | 4/2004 |
| JP | 2004-132535 | 4/2004 |
| JP | 2004-183768 | 7/2004 |

* cited by examiner

*Primary Examiner*—Thomas R. Hannon
(74) *Attorney, Agent, or Firm*—Wenderoth, Lind & Ponack, L.L.P.

(57) ABSTRACT

In order to prevent lubricating oil leakage due to bubbles in a thrust dynamic pressure bearing having herringbone grooves, and to stabilize the bearing performance, and enhance the reliability and durability, auxiliary grooves deeper than pump-in type herringbone grooves for generating dynamic pressure are provided. The bearing inner periphery and bearing outer periphery are linked by a pressure gradient descending slowly, and therefore bubbles present in the bearing inner periphery can be guided to the bearing outer periphery through the auxiliary grooves, and discharged outside of the bearing from the air-liquid interface, so that lubricating oil leakage due to bubbles can be prevented.

49 Claims, 16 Drawing Sheets

US 7,160,031 B2

THRUST DYNAMIC PRESSURE BEARING, SPINDLE MOTOR USING THE SAME, AND INFORMATION RECORDING AND REPRODUCING APPARATUS USING THEM

FIELD OF THE INVENTION

The present invention relates to a thrust type dynamic pressure bearing for supporting the load in the axial direction in a rotary machine rotating smoothly at high speed, and more particularly to a thrust dynamic pressure bearing capable of eliminating bubbles mixing in a lubricating oil easily without allowing to stay in the bearing, a spindle motor using it, and an information recording and reproducing apparatus using them.

BACKGROUND OF THE INVENTION

In a spindle motor for rotating recording media of information recording and reproducing apparatus such as a hard disk drive, as means for supporting the load in the axial direction of rotor and suppressing deflection of rotor rotation, various thrust type dynamic pressure bearings are proposed, which are designed to generate dynamic pressure by herringbone grooves having middle flex part (for example, see Japanese Patent Registration No. 3155529).

Referring first to FIG. 14 and FIG. 15, the thrust type dynamic pressure bearing for generating dynamic pressure by herringbone grooves is briefly explained below. FIG. 14 (a) is a sectional view explaining the structure of a conventional thrust dynamic pressure bearing, FIG. 14 (b) is a sectional view explaining the structure of another conventional thrust dynamic pressure bearing, FIG. 14 (c) is a diagram showing a groove pattern shape of a bearing surface of a conventional thrust dynamic pressure bearing, and FIG. 15 is a graph showing the pressure distribution in the radial section of a herringbone groove of a conventional thrust dynamic pressure bearing.

FIGS. 14 (a) and (b) show the thrust dynamic pressure bearing having herringbone grooves in the prior art, and specifically FIG. 14 (a) shows bearing surface 21 at the face side of bearing rotary side member 10, and FIG. 14 (b) shows bearing surface 21 at the reverse side of bearing rotary side member 10. In the axial direction of rotation center axis 1, mutually opposing bearing surface 11 of bearing rotary side member 10 and bearing surface 21 of bearing fixed side member 20 are formed across a tiny gap filled with lubricating oil 50, a seal is provided on the outer side of the tiny gap for forming air-liquid interface 51 of lubricating oil and air, and plural herringbone grooves 30 for generating dynamic pressure shown in FIG. 14 (c) are formed on bearing surface 11 of bearing rotary side member 10 at a specified pitch.

When bearing rotary side member 10 rotates in the arrow direction in FIG. 14, dynamic pressure is induced in lubricating oil 50, and when the dynamic pressure reaches the maximum near middle flex part 31 of herringbone grooves 30, a pressure peak appears, and the pressure distribution in bearing radial section S–S' declines toward the inside and outside in the radial direction from the peak of around middle flex part 31 as shown in FIG. 15. The thrust dynamic pressure bearing having herringbone grooves 30 supports the load in the axial direction of bearing rotary side member 10 in this pressure peak portion.

The thrust dynamic pressure bearing having herringbone grooves 30 has its pressure peak in middle flex part 31 of herringbone grooves 30 apart from rotation center axis 1 in the radial direction, and is hence higher in rotation rigidity as compared with a thrust dynamic pressure bearing having spiral grooves showing pressure peak in the center of the bearing. That is, the thrust dynamic pressure bearing having spiral grooves only supports the load in the axial direction, while the thrust dynamic pressure bearing having herringbone grooves not only supports the load in the axial direction, but also functions to suppress deflection of rotation of bearing rotary side member 10 owing to its high rotation rigidity. It is hence suited as thrust dynamic pressure bearing of thin type spindle motor difficult to assure a sufficient radial bearing length.

Usually, in the thrust dynamic pressure bearing having herringbone grooves 30, a centrifugal force due to rotation of fluid flowing in the so-called pump-out portion is applied to the inner side, and a strong force for attracting the fluid to the outer side works near the axial center of the gap of the thrust dynamic pressure bearing. Accordingly, when rotating at high speed, a negative pressure is likely to occur in the region of the inner side from the pump-out portion. In such negative pressure, bubbles are likely to be formed in the fluid, and these bubbles are believed to induce decline of bearing performance, in particular, performance decline of thrust dynamic pressure bearing. To suppress these bubbles, it has been proposed to suppress generation of negative pressure at the inner side and prevent occurrence of bubbles by dislocating middle flex part 31 of herringbone grooves 30 to the inner side, and reinforcing the pumping action in the pump-in portion at the outer side from the pump-out portion of the inner side (for example, see Japanese Laid-open Patent Publication No. 2001-173645).

If bubbles mix in lubricating oil 50 due to some reason, the bubbles move from a higher level to a lower level of pressure along the pressure gradient. As described above, the pressure distribution in the radial section of thrust dynamic pressure bearing has its peak near middle flex part 31 of herringbone grooves 30 as shown in FIG. 15 regardless of the position in the section, showing a mountain-like profile becoming lower toward the inside and outside in the radial direction. Accordingly, the mixing bubbles move, as shown in FIG. 15, after reaching the pressure peak of middle flex part, to the lower pressure parts, that is, the inner periphery of the bearing or the outer periphery of the bearing. The bubbles moving to the outer periphery of the bearing are discharged outside of the bearding from air-liquid interface 51, but bubbles moving to the inner periphery of the bearing are not discharged, and stay within the inner periphery of the bearing. Thus, when bubbles are present in the bearing, the bubbles rotate without synchronism with the rotation of the rotor, the bearing rigidity fluctuates during rotation, deflection that is not synchronous with rotation is generated, and stable rotary motion of the shaft is spoiled. Further, if bubbles are stagnant in the inner periphery of the bearing, when exposed to a reduced pressure environment or high temperature environment, the bubbles expand and force the lubricating oil outside of the bearing to lead to a lubricating oil leak, or the leaking lubricating oil stains the outer parts of the bearing. Hence, various methods have been proposed for removing bubbles generated or staying in the bearing parts (for example, see Japanese Laid-open Patent No. 2004-112874, Japanese Laid-open Patent No. 2004-132535, Japanese Laid-open Patent No. 2004-183768, etc.).

Examples of eliminating bubbles generated or staying in the bearing parts of a thrust dynamic pressure bearing are explained below.

FIG. 16 (a) is an example of a structure for removing bubbles, showing a groove pattern shape of a bearing surface of a thrust dynamic pressure bearing. In this example, the thrust dynamic pressure bearing having spiral grooves is shown, instead of the thrust dynamic pressure bearing having herringbone grooves explained above. In FIG. 16 (a), at the radial inner side of thrust bearing 150 having spiral grooves 150a, radiant grooves 153 are formed from the radial inner end of spiral grooves 150a for generating dynamic pressure provided at the upper end of housing 151 of thrust bearing 150, to the radial inner end of the end face of sleeve 152. Bubbles mixing in oil are agitated by these radiant grooves 153 during rotation, and cracked finely, and are discharged from the bearing gaps axial grooves 155 and communicating holes 154, and hence bubbles mixing in the oil can be discharged.

FIG. 16 (b) is another example of a structure for removing bubbles, showing another groove pattern shape of a bearing surface of a thrust dynamic pressure bearing. In this example, too, the thrust dynamic pressure bearing having spiral grooves is shown, instead of the thrust dynamic pressure bearing having herringbone grooves explained above. In FIG. 16 (b), two spiral grooves 150a, 150b of pump-in type are provided as dynamic pressure generating grooves for generating dynamic pressure provided at the upper end of sleeve 152 as thrust bearing 150. One spiral groove is an ordinary spiral groove 150a for generating dynamic pressure, and the other spiral groove 150b is at least one extended to the radial inner side, and is formed larger in width in the peripheral direction than the ordinary spiral groove 150a. The other spiral groove 150b is larger in width in the peripheral direction so as to collect bubbles, and is extended to the radial inner side so as to discharge bubbles.

However, in the thrust dynamic pressure bearing having herringbone grooves, the thrust dynamic pressure bearing of the structure for suppressing generation of negative pressure in the region of the inner side and preventing generation of bubbles by dislocating middle flex part 31 of herringbone grooves 30 in the inner side and reinforcing the pumping action of pump-in portion at the outer side of the pump-out portion at the inner side requires not only much time in design of setting the position of middle flex part 31 and the groove shape of the dynamic pressure generating groove, but also requires higher precision than ordinary herringbone grooves, and therefore a new problem of soaring material cost must be solved.

Various proposals for discharging bubbles generated or stagnant in the thrust dynamic pressure generating parts mostly relate to thrust pressure generating parts of the spiral type, and almost nothing discusses the thrust dynamic pressure generating parts of the herringbone type. In the case of thrust dynamic pressure generation parts, between the spiral type and herringbone type, the principle of generating dynamic pressure is basically the same, but the fluid flowing direction is different. That is, in the spiral type, the fluid flows only in one direction in the outer direction from either the outer side or the inner side of the periphery of the thrust dynamic pressure generating parts. In the thrust dynamic pressure generating parts of the herringbone type, the fluid flows from both the outer side and the inner side of the periphery toward the middle flex part. Accordingly, the proposals of forming radiant grooves separately, partly extending plural dynamic pressure generating grooves, or expanding the width dimension in the peripheral direction seem to be effective for thrust dynamic pressure generating parts of the spiral type, but they can hardly be applied in the thrust dynamic pressure generating parts of the herringbone type.

Further, for the purposes of forming radiant grooves separately in the thrust dynamic pressure generating parts of the spiral type, partly extending plural dynamic pressure generating grooves, or expanding the width dimension in the peripheral direction, an extra area of circular plane for forming thrust dynamic pressure generating parts is required, or the bearing parts are increased in size, which is difficult to use in small size applications. To realize these proposals without increasing the area of circular plane for forming thrust dynamic pressure generating parts, the area of the portion for forming thrust dynamic pressure generating parts of the spiral type must be reduced, but the generating dynamic pressure is decreased in this case, and the operation as thrust bearing is difficult, and serious quality troubles may occur, and these are important problems to be solved.

SUMMARY OF THE INVENTION

The invention is devised to solve the problems of the prior art, and it is hence a primary object thereof to present a thrust dynamic pressure bearing of high reliability and durability, being a thrust dynamic pressure bearing for generating dynamic pressure by herringbone grooves capable of guiding bubbles mixing in lubricating oil to the outer periphery of the bearing without allowing the bubbles to stay within the inner periphery of bearing, discharging the bubbles to outside of the bearing from the air-liquid interface of lubricating oil, preventing lubricating oil leak due to bubbles, and obtaining stable bearing performance, in a simple structure, without requiring change of size and design of the thrust dynamic pressure bearing itself, and further a spindle motor using it, and an information recording and reproducing apparatus using them.

To solve the problems, the thrust dynamic pressure bearing of the invention is a thrust dynamic pressure bearing comprising mutually opposing bearing surfaces of a bearing rotary side member and a bearing fixed side member formed across a tiny gap in the axial direction, with the tiny gap being filled with lubricating oil. Plural herringbone dynamic pressure generating grooves having a middle flex part are provided in one of the bearing surface of the bearing rotary side member and the bearing surface of the bearing fixed side member, and a seal for forming an interface of lubricating oil and air is provided at the outer side of the tiny gap. The thrust dynamic pressure bearing is designed to hold rotation by rotating the bearing rotary side member to induce dynamic pressure of lubricating oil by dynamic pressure generating grooves, in which at least one auxiliary groove is provided for communicating between the bearing inner periphery and bearing outer periphery. Still more, the depth of the auxiliary groove may be deeper than that of the dynamic pressure generating grooves, or the depth of the auxiliary groove may be 3 to 5 times the depth of the dynamic pressure generating grooves.

The herringbone dynamic pressure generating grooves may be designed in any structure, such as a pump-in type structure in which the area from the middle flex part to the radial outer section is greater than the area of the inner section, a structure in which the dynamic pressure generating grooves and auxiliary groove are both provided at the bearing surface of the bearing fixed side member, a structure in which the dynamic pressure generating grooves and auxiliary groove are both provided at the bearing surface of the bearing rotary side member, a structure in which the shape of auxiliary groove is that of a pump-in type spiral groove, a structure in which the shape of auxiliary groove is that of a straight groove, a structure in which the dynamic pressure generating grooves are provided at the bearing surface of the bearing rotary side member and the auxiliary groove is provided at the bearing surface of the bearing fixed side member, or a structure in which the dynamic pressure generating grooves are provided at the bearing surface of the bearing fixed side member and the auxiliary groove is provided at the bearing surface of the bearing rotary side member.

According to these structures, the pressure gradient in the auxiliary groove is slightly downward from the bearing inner periphery of high pressure to the outer periphery of low pressure, and by the pressure peak formed near the middle flex part of the herringbone grooves, stagnant bubbles in the bearing inner periphery are guided to the outer periphery through the auxiliary groove, and securely discharged outside of the bearing.

The thrust dynamic pressure bearing of the invention can be also designed with a structure in which the auxiliary groove is provided away from the middle flex part of the herringbone grooves which generate dynamic pressure.

According to this structure, the effect of the auxiliary groove on the dynamic pressure generating action of the herringbone grooves can be kept to a minimum, and the dynamic pressure generating capacity of the thrust dynamic pressure generating section is increased outstandingly as compared with the prior art, such as separate formation of radial grooves for discharging bubbles in the thrust dynamic pressure generating section in the conventional spiral type, partial extension of plural dynamic pressure generating grooves, or expansion of width size in the peripheral direction.

Further, to solve the problems, the spindle motor of the invention is a spindle motor comprising a rotor composed of a flange having a rotary magnet affixed to the outer periphery and a hollow cylindrical part provided at the inner periphery for rotating about a fixed shaft having the center of rotation. The spindle motor also includes a stator having a coil and affixed to a chassis opposite to the rotary magnet, and an annular fixed side bearing member having an inner periphery opposite to the outer periphery of the hollow cylindrical part and an upper end opposite to the lower end of the flange. Further, the spindle motor includes a thrust dynamic pressure bearing in which plural herringbone dynamic pressure generating grooves having a middle flex part provided in either one are formed at the upper end of the fixed side bearing member and the lower side of the opposite flange by way of a tiny gap, the tiny gap is filled with lubricating oil, and when the rotor rotates, dynamic pressure is induced in the lubricating oil by dynamic pressure generating grooves, thereby holding the rotation, and the thrust dynamic pressure bearing further comprises at least one auxiliary groove provided for communicating between the bearing inner periphery and bearing outer periphery. Further, the auxiliary groove may be deeper than the dynamic pressure generating grooves, or the auxiliary groove may be a pump-in type spiral groove.

According to these structures, a spindle motor of stable performance and high reliability and durability, being free from lubricating oil leak due to bubbles, is realized.

Also to solve the problems, the information recording and/or reproducing apparatus of the invention is an information recording and/or reproducing apparatus comprising a disk, a signal converter for recording and/or reproducing in recording medium formed in the disk, oscillating means for positioning the recording medium at specified track position, and a spindle motor comprising a rotor composed of a flange having a rotary magnet affixed to the outer periphery and a hollow cylindrical part provided at the inner periphery for rotating about a fixed shaft having the center of rotation, a stator having a coil and affixed to a chassis opposite to the rotary magnet, and an annular fixed side bearing member having an inner periphery opposite to the outer periphery of the hollow cylindrical part and an upper end opposite to the lower end of the flange, and further a thrust dynamic pressure bearing in which plural herringbone dynamic pressure generating grooves having a middle flex part provided in either one are formed at the upper end of the fixed side bearing member and the lower side of the opposite flange by way of a tiny gap, the tiny gap is filled with lubricating oil, and when the rotor rotates, dynamic pressure is induced in the lubricating oil by dynamic pressure generating grooves, thereby holding the rotation, and the thrust dynamic pressure bearing further comprises at least one auxiliary groove provided for communicating between the bearing inner periphery and bearing outer periphery. Still more, the auxiliary groove may be deeper than the dynamic pressure generating grooves, or the shape of the auxiliary groove may be pump-in type spiral groove.

According to these structures, an information recording and reproducing apparatus of high reliability and durability, being free from contamination due to lubricating oil leak, is realized.

Therefore, in the thrust dynamic pressure bearing of the invention, only by adding a simple auxiliary groove, bubbles mixing into the lubricating oil can be discharged reliably without allowing them to stay within the bearing, and a lubricating oil leak due to the bubbles can be prevented, and hence stable bearing performance is obtained, and the bearing is also enhanced in reliability and durability.

Also by using such thrust bearing, bubbles mixing in the lubricating oil can be discharged reliably only by adding a simple auxiliary groove, a spindle motor of high reliability and durability is realized, and a spindle motor of small size and thin type is realized, and by mounting such spindle motor, an information recording and reproducing apparatus having high reliability and durability can be realized, and the apparatus can be reduced in size and thickness at the same time.

BRIEF DESCRIPTION OF THE DRAWINGS

FIG. 1 (b) is a schematic diagram of the bearing surface of the rotary side member of the thrust dynamic pressure bearing in the preferred embodiment 1 of the invention.

FIG. 1 (c) is a schematic diagram of a bearing surface of a fixed side member of the thrust dynamic pressure bearing in the preferred embodiment 1 of the invention.

FIG. 4 (b) is a structural diagram of dynamic pressure generating grooves and an auxiliary groove provided on the bearing surface of the bearing fixed side member of the thrust dynamic pressure bearing in preferred embodiment 1 of the invention.

FIG. 5 (b) is a schematic bearing surface diagram of a bearing fixed side member or bearing rotary side member having a straight groove as an auxiliary groove of the thrust dynamic pressure bearing in preferred embodiment 1 of the invention.

FIG. 6 (b) is a schematic diagram of a bearing surface of a fixed side member of the thrust dynamic pressure bearing in preferred embodiment 2 of the invention.

FIG. 7 (b) is a structural diagram of an auxiliary groove provided on the bearing surface of the bearing rotary side member, and forming dynamic pressure generating grooves on the bearing surface of the bearing fixed side member of the thrust dynamic pressure bearing in preferred embodiment 2 of the invention.

FIG. 8 (b) is a schematic diagram of the bearing surface of the bearing fixed side member or the bearing surface of the bearing rotary side member having a straight groove as the auxiliary groove of the thrust dynamic pressure bearing in preferred embodiment 2 of the invention.

FIG. 14 (b) is a structural diagram of another conventional thrust dynamic pressure bearing.

FIG. 14 (c) is a diagram showing a groove pattern shape of a bearing surface of the conventional thrust dynamic pressure bearing.

FIG. 16 (b) is a diagram showing a groove pattern shape of a bearing surface of another thrust dynamic pressure bearing having spiral grooves.

DETAILED DESCRIPTION OF THE INVENTION

Figure 1:
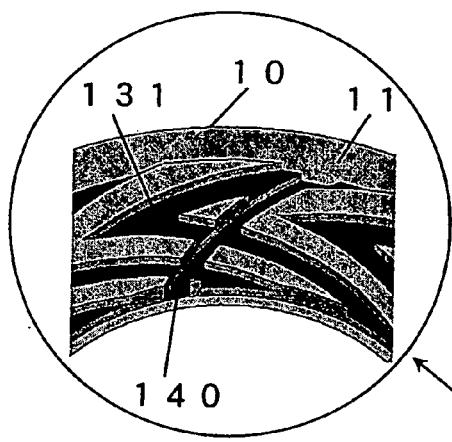
FIG. 1 (a) is a perspective view of a magnified portion of a bearing surface of a rotary side member of a thrust dynamic pressure bearing in a preferred embodiment 1 of the invention.
Figure 1:
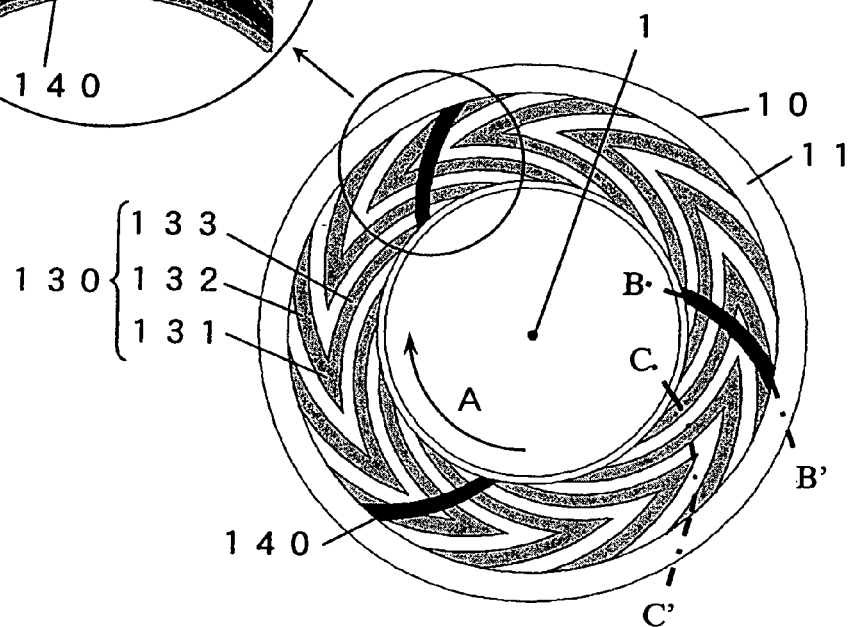
Figure 1:
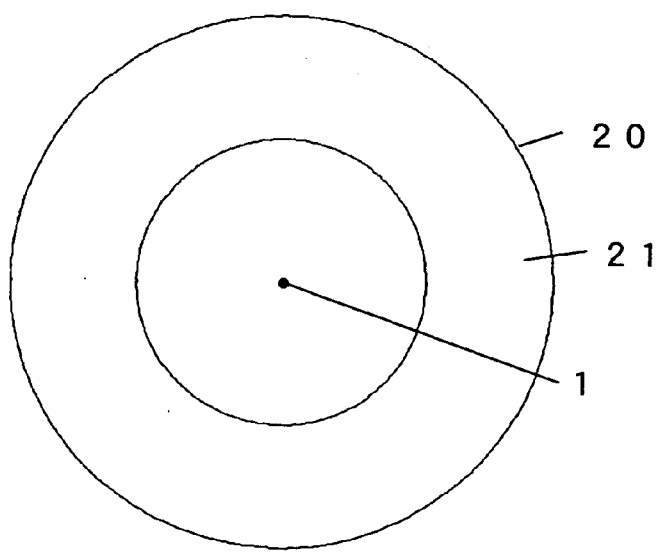

Referring now to the drawings, preferred embodiments of the invention are described specifically below.

Preferred Embodiment 1

Figure 2:
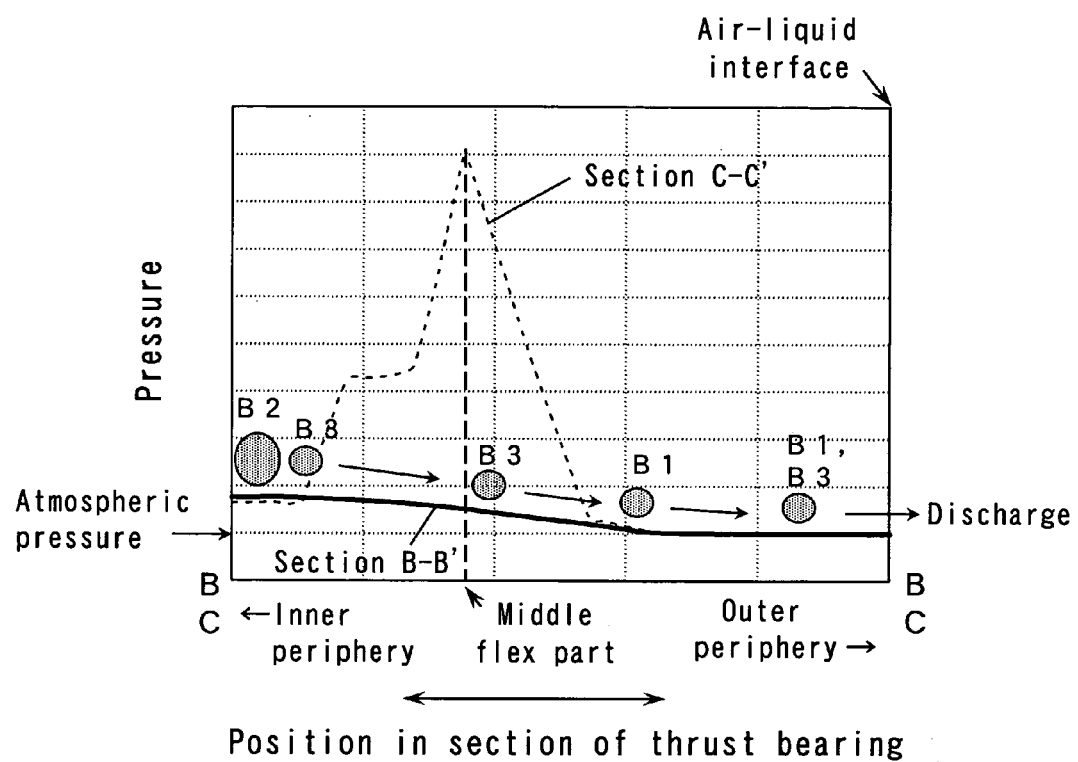
FIG. 2 is a pressure distribution diagram of the bearing section of the thrust dynamic pressure bearing in preferred embodiment 1 of the invention.
Figure 3:
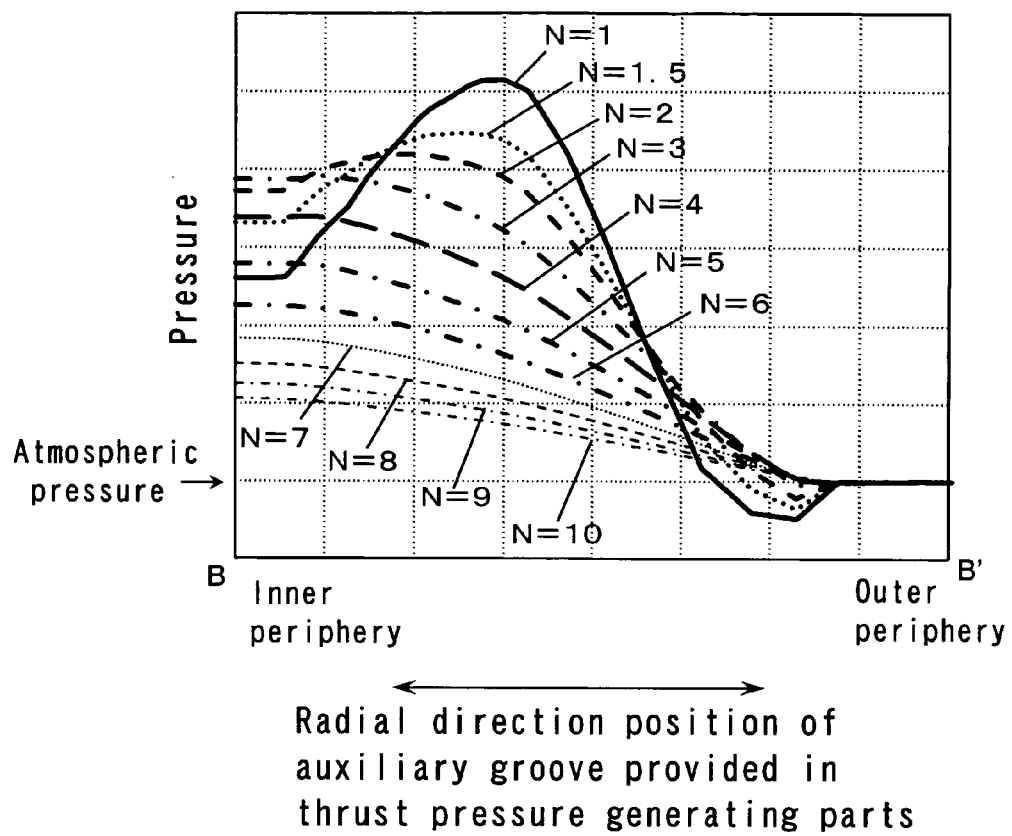
FIG. 3 is a pressure distribution diagram of an auxiliary groove section of the thrust dynamic pressure bearing in preferred embodiment 1 of the invention, showing the depth of the auxiliary groove as a parameter.
Figure 4:
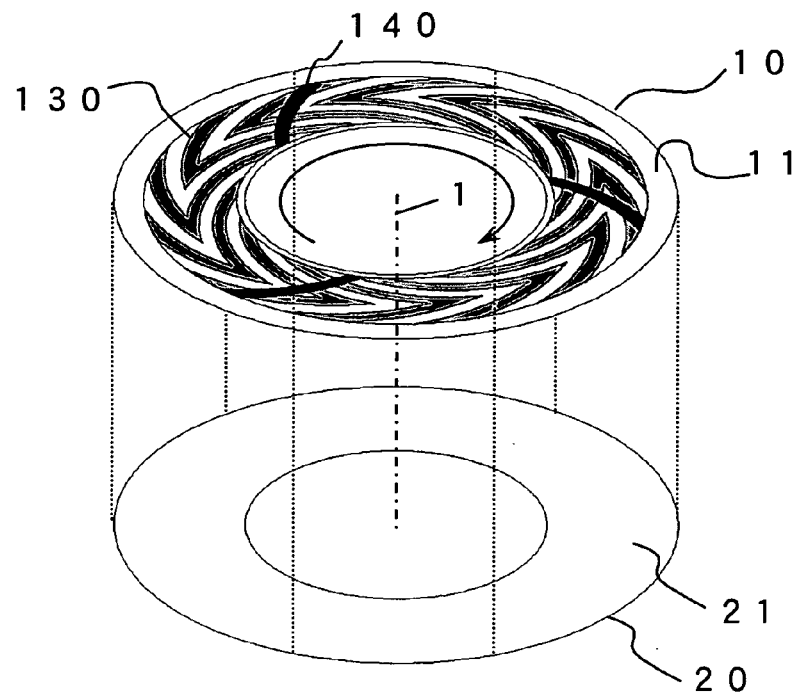
FIG. 4 (a) is a structural diagram of dynamic pressure generating grooves and an auxiliary groove provided on the bearing surface of the bearing rotary side member of the thrust dynamic pressure bearing in preferred embodiment 1 of the invention.
Figure 4:
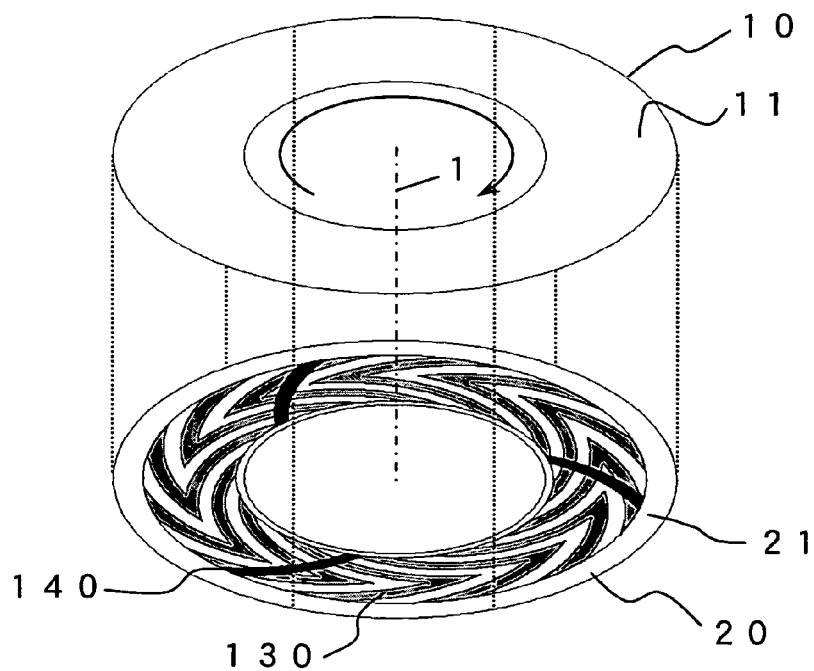
Figure 14:
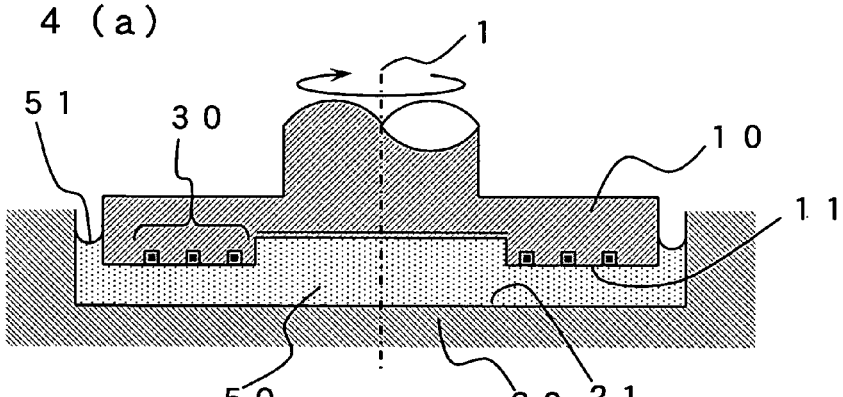
FIG. 14 (a) is a structural diagram of a conventional thrust dynamic pressure bearing.
Figure 14:
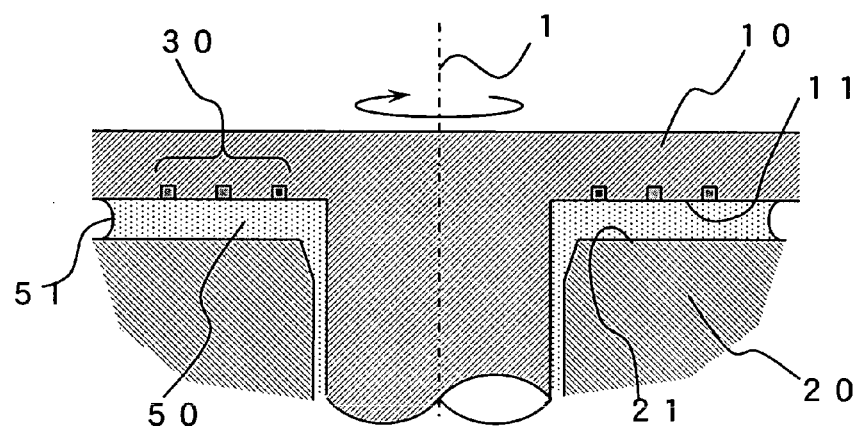
Figure 14:
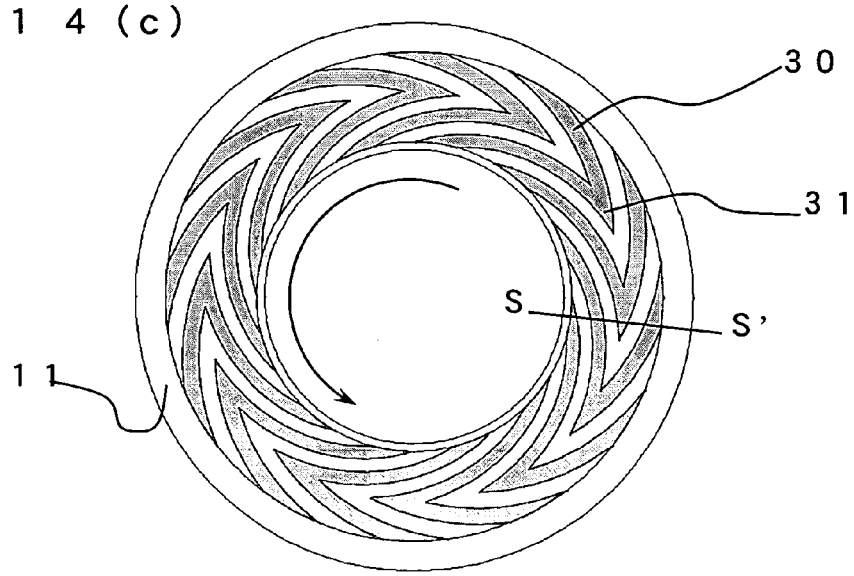
Figure 15:
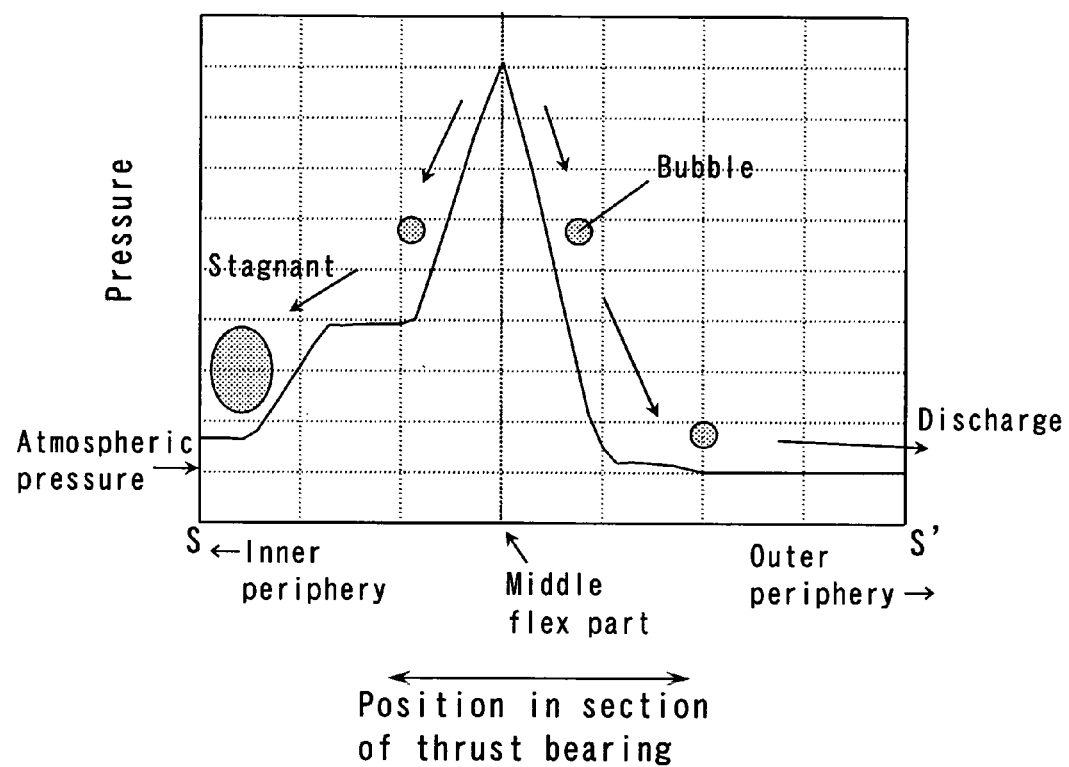
FIG. 15 is a graph showing a pressure distribution in a radial direction of herringbone grooves of the conventional thrust dynamic pressure bearing.
Figure 16A:
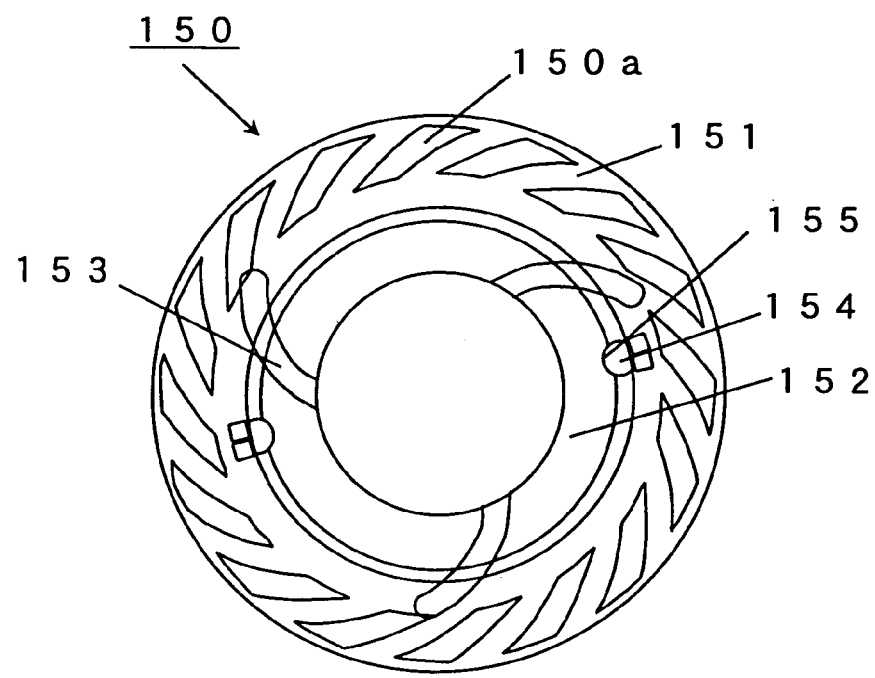
FIG. 16 (a) is a diagram showing a groove pattern shape of a bearing surface of a thrust dynamic pressure bearing having spiral grooves.
Figure 16B:
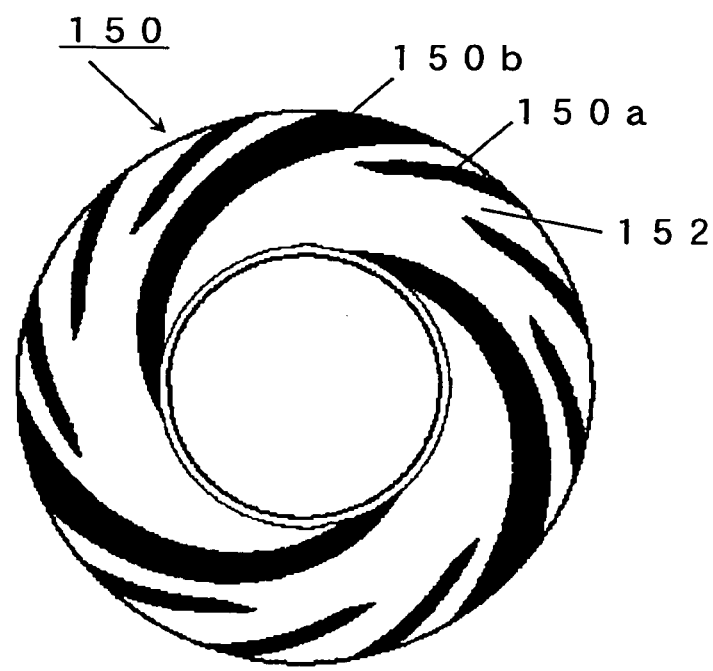

A thrust dynamic pressure bearing in preferred embodiment 1 of the invention is explained by referring to FIG. 1(a) to FIG. 5(b). FIG. 1 (a) is a perspective view of a magnified portion of a bearing surface of a rotary side member of a thrust dynamic pressure bearing in a preferred embodiment 1 of the invention. FIG. 1 (b) is a schematic diagram of bearing surface of the rotary side member of the thrust dynamic pressure bearing in preferred embodiment 1 of the invention, FIG. 1 (c) is a schematic diagram of bearing surface of fixed side member of thrust dynamic pressure bearing in preferred embodiment 1 of the invention, FIG. 2 is a pressure distribution diagram of bearing section of thrust dynamic pressure bearing in preferred embodiment 1 of the invention, FIG. 3 is a pressure distribution diagram of auxiliary groove section of thrust dynamic pressure bearing in preferred embodiment 1 of the invention, showing the depth of auxiliary groove as parameter, FIG. 4 (a) is a structural diagram of dynamic pressure generating grooves and auxiliary groove provided on bearing surface of bearing rotary side member of thrust dynamic pressure bearing in preferred embodiment 1 of the invention, FIG. 4 (b) is a structural diagram of dynamic pressure generating grooves and auxiliary groove provided on bearing surface of bearing fixed side member of thrust dynamic pressure bearing in preferred embodiment 1 of the invention, FIG. 5 (a) is a bearing surface diagram of bearing rotary side member or bearing fixed side member having a straight groove as auxiliary groove of thrust dynamic pressure bearing in preferred embodiment 1 of the invention, and FIG. 5 (b) is a schematic bearing surface diagram of bearing fixed side member or bearing rotary side member having a straight groove as auxiliary groove of thrust dynamic pressure bearing in preferred embodiment 1 of the invention. The thrust dynamic pressure bearing in preferred embodiment 1 of the invention shown in FIG. 1 and FIG. 4 is similar to the conventional thrust dynamic pressure bearing shown in FIG. 14, except that the auxiliary groove for discharging the bubbles mixing into the lubricating oil is formed on the bearing surface forming herringbone grooves for generating dynamic pressure, and other basic structures are the same, and explanation of duplicate parts is omitted. The same constituent elements as in FIG. 14 are identified with the same reference numerals.

In FIGS. 1(a)–(c), FIG. 2, and FIGS. 4(a) and (b), in the axial direction of rotation center axis 1, mutually opposing bearing surface 11 of bearing rotary side member 10 and bearing surface 21 of bearing fixed side member 20 are formed across a tiny gap filled with lubricating oil (not shown). A seal is provided on the outer side of the tiny gap for forming an air-liquid interface (not shown) of lubricating oil and air, and plural herringbone grooves 130 having middle flex part 131 for generating dynamic pressure are formed on bearing surface 11 of bearing rotary side member 10 at a specified pitch, as shown in the magnified portion perspective view of FIG. 1(*a*). Herringbone grooves 130 are of a pump-in type so that the pressure of the bearing inner periphery may be higher than in the bearing outer periphery, and the position of middle flex part 131 is determined so that the area of radial outer section 132 from middle flex part 131 may be greater than the area of radial inner section 133.

Further, on the same bearing surface 11, at least one spiral auxiliary groove 140 of pump-in type is formed for discharging bubbles. In FIG. 1 and FIG. 4, three auxiliary grooves 140 are shown, and when two or more are provided, auxiliary grooves are formed at a specified pitch in uniform intervals. Further, to minimize the effect of auxiliary groove 140 on the dynamic pressure generating action of herringbone grooves 130, auxiliary groove 140 is formed away from middle flex part 131 (i.e., the apex constituted by the junction between the radial inner section 133 and radial outer section 132) so as not to interfere with middle flex part 131 of herringbone grooves 130. On the other hand, as shown in FIG. 1 (*c*), bearing surface 21 of bearing fixed side member 20 opposite to bearing surface 11 of bearing rotary side member 10 is a smooth surface.

In the thrust dynamic pressure bearing having such structure, when bearing rotary side member 10 rotates in the arrow A direction, lubricating oil flows toward middle flex part 131 along radial outer section 132 and inner section 133 of herringbone grooves 130, and a pressure peak of maximum dynamic pressure appears in middle flex part 131, and the pressure distribution in the bearing radial direction forms a mountain-like profile reaching the peak near middle flex part 131 and falling toward the bearing outer periphery and the bearing inner periphery.

At this time, since herringbone grooves 130 are of so-called pump-in type, that is, the area of radial outer section 132 from middle flex part 131 is greater than the area of inner section 133, the pressure of radial outer section 132 of herringbone grooves 130 pumping the lubricating oil to the inner peripheral side is greater than the pressure of inner section 133 pumping to the outer peripheral side, and hence the pressure of the bearing inner periphery is higher than in the bearing outer periphery.

On the other hand, since the depth of auxiliary groove 140 is deeper than herringbone grooves 130 for generating dynamic pressure, dynamic pressure is hardly generated by auxiliary groove 140, and the pressure of auxiliary groove 140 shows a pressure profile moderately declining from the bearing inner periphery of higher pressure than the bearing outer periphery owing to the effect of herringbone grooves 130 of pump-in type, toward the bearing outer periphery contacting with outside air at the air-liquid interface.

FIG. 2 shows the pressure distribution in section B–B' crossing auxiliary groove 140 shown in FIG. 1 (*a*) and section C–C' passing middle flex part 131 of herringbone grooves 130. In FIG. 2, the pressure distribution in section B–B' is indicated by a solid line, and the pressure distribution in section C–C' is indicated by a dotted line.

In the thrust dynamic pressure generating part shown in FIG. 1 (*a*), the region free from auxiliary groove 140 shows a mountain-like distribution having the peak near middle flex part 131, same as the pressure distribution in section C–C' indicated by dotted line in FIG. 2, and therefore bubble B1 existing outside of middle flex part 131 moves along the bearing outer periphery along the pressure gradient and is discharged, but bubble B2 existing inside of middle flex part 131 cannot surpass the peak of pressure, and is collected in the bearing inner periphery. However, in the portion of auxiliary groove 140, as indicated by solid line in FIG. 2, since the pressure gradient is slightly descending from the bearing inner periphery toward the bearing outer periphery, bubbles B3 collected in bearing inner periphery move to the bearing outer periphery by way of auxiliary groove 140, and are discharged outside of the bearing from the air-liquid interface.

Therefore, by adding auxiliary groove 140 crossing in the radial direction, and not passing through middle flex part 131 of herringbone grooves 130 of the thrust dynamic pressure generating parts, bubbles mixing or staying in the lubricating oil can be reliably discharged to outside. Such auxiliary groove 140 formed in herringbone grooves 130 is provided away from middle flex part 131 so as not to interfere with middle flex part 131, and effects on dynamic pressure generating action can be suppressed to minimum. As compared with the conventional methods of forming radial grooves separately, extending part of plural dynamic pressure generating grooves, or expanding the width size in the peripheral direction in the thrust dynamic pressure generating parts of spiral type, the dynamic pressure generating capacity of the thrust dynamic pressure generating parts of preferred embodiment 1 of the invention is outstandingly greater.

Referring now to FIG. 3, the relation between the depth of auxiliary groove 140 provided in herringbone grooves 130 in the dynamic pressure generating parts and the bubble discharge capacity is explained. FIG. 3 shows the pressure distribution in the radial position by changing the depth of auxiliary groove 140 crossing along line B–B' not passing middle flex part 131 of herringbone grooves 130 in the thrust dynamic pressure generating parts 130. The depth of auxiliary groove 140 is changed by multiple N of the depth of herringbone grooves 130, and is changed from the same depth N=1 as herringbone grooves 130 to 10 times of the depth of herringbone grooves 130, that is, N=10.

In FIG. 3, if the depth of the auxiliary groove is less than 2 times the depth of the herringbone grooves, for example, N=1, N=1.5, or N=2, there is a mountain in pressure distribution, and it seems difficult to discharge bubbles in the inner periphery of the thrust bearing. At N=2 or less, if the depth of auxiliary groove 140 is close to the depth of herringbone grooves 130, the effect of pressure of herringbone grooves 130 is applied also to auxiliary groove 140, and it seems a mountain is formed in the pressure distribution.

At N≧3, that is, when the depth of auxiliary groove 140 is 3 or more times the depth of herringbone grooves 130, there is no mountain in pressure distribution, and the pressure declines from the inner periphery to the outer periphery of the bearing, and hence bubbles in the bearing inner periphery are discharged smoothly. In particular, in a multiple range of N=3 to N=5, being 3 times to 5 times, since the pressure gradient is large, and the bubble discharge capacity seems to be large, but as auxiliary groove 140 becomes deeper, the pressure gradient becomes smaller, and the bubble discharge capacity becomes smaller. In the multiple range of N=3 to N=5, the pressure gradient is large, and it is because the pressure in the bearing inner periphery is high. Actually, as shown in FIG. 3, in the multiple range of N=3 to N=5, the pressure in the innermost periphery of bearing is higher than when N=1. It may be explained as follows: by the pump-in action of spiral auxiliary groove 140, the lubricating oil flows toward the bearing inner periphery, and the pressure in the bearing inner periphery elevates. On the other hand, at $N \geq 6$, at a multiple of 6 or more times the depth of herringbone grooves 130, the auxiliary groove 140 is too deep, and pump-in action is small, and the pressure elevation in the innermost periphery of the bearing is small.

Summing up the explanation above, when the depth of auxiliary groove 140 is 2 times or less of the depth of herringbone grooves 130, the pressure distribution is formed like a mountain, and it is hard to discharge bubbles. At 6 or more times the depth, the pressure gradient is small, and the bubble discharge effect is small, whereas when the depth of auxiliary groove 140 is in a range of 3 times to 5 times the depth of herringbone grooves 130, the pressure gradient is great and the bubble discharge effect is large. When auxiliary groove 140 is formed in a range of 3 times to 5 times the depth of herringbone grooves 130, the pump-in action of spiral auxiliary groove 140 is great, and it is less likely to have effects of pressure of herringbone groove 130. It is therefore preferred to form the depth of auxiliary groove 140 at 3 times to 5 times the depth of herringbone grooves 130, and it is most preferable to form in the depth of 3 times of herringbone grooves where the pressure gradient is the maximum.

On the other hand, when the groove width of auxiliary groove 140 is narrower than herringbone grooves 130, the pump-in action is small, and when wider than herringbone grooves 130, the effect of dynamic pressure generating effects of herringbone grooves 130 is larger, and hence the groove width is preferred to be similar to that of herringbone grooves 130.

In the above explanation, as shown in the perspective view in FIG. 4 (a), herringbone grooves 130 and auxiliary grooves 140 are formed in bearing surface 11 of bearing rotary side member 10, and bearing surface 21 of bearing fixed side member 20 is a smooth surface. However, the thrust dynamic pressure bearing in preferred embodiment 1 of the invention is not limited to this configuration, and as shown in FIG. 4 (b), herringbone grooves 130 and auxiliary grooves 140 may be formed in bearing surface 21 of bearing fixed side member 20, and bearing surface 11 of bearing rotary side member 10 may be a smooth surface.

Figure 5:
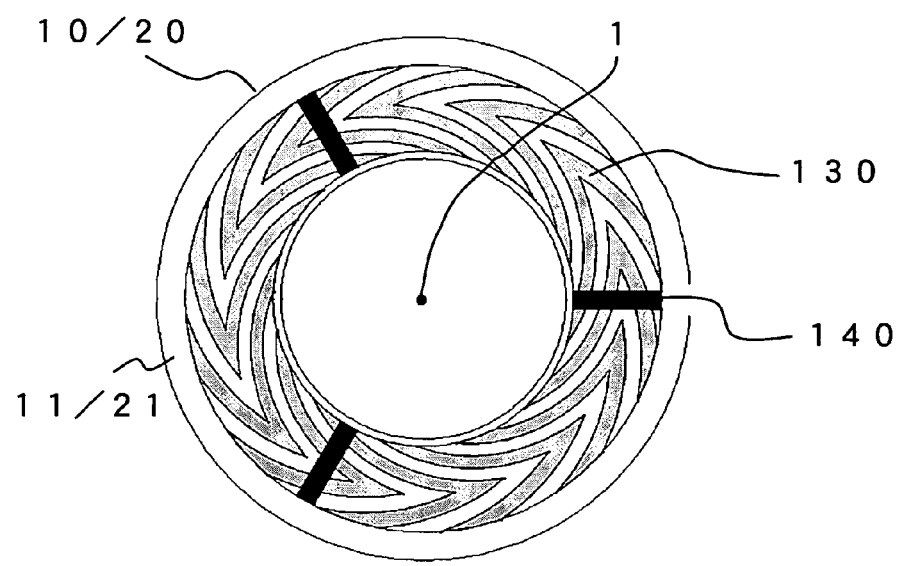
FIG. 5 (a) is a bearing surface diagram of a bearing rotary side member or a bearing fixed side member having a straight groove as an auxiliary groove of the thrust dynamic pressure bearing in preferred embodiment 1 of the invention.
Figure 5:
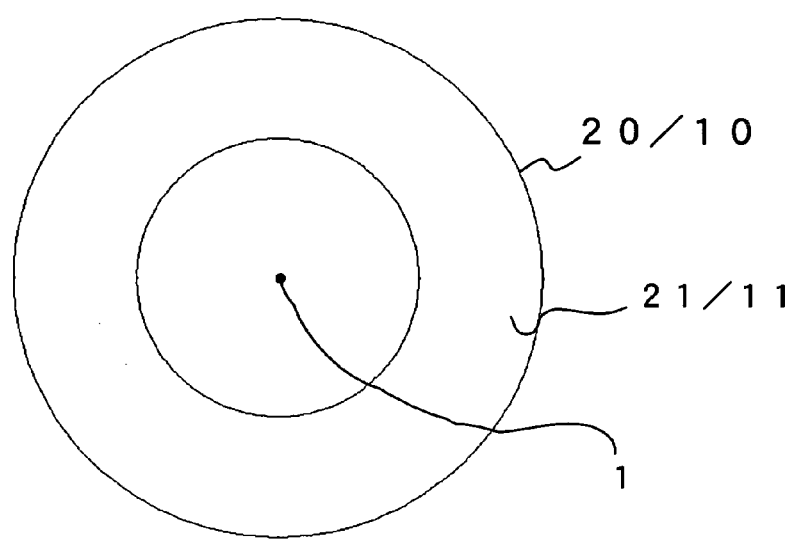

In the above explanation, auxiliary groove 140 provided in the thrust pressure generating parts is a pump-in type spiral shape, but as shown in FIG. 5, auxiliary groove 140 may be provided by forming a straight groove. That is, herringbone grooves 130 and straight auxiliary groove 140 may be formed in bearing surface 11 of bearing rotary side member 10, or bearing surface 21 of bearing fixed side member 20, and opposing bearing surface 21 of bearing fixed side member 20, or bearing surface 11 of bearing rotary side member 10 may be as a smooth surface.

In the drawings used in the explanation above, three auxiliary grooves 140 are formed in the thrust dynamic pressure generating parts, but the invention is not limited to this number, and one, two or four auxiliary grooves 140 may be provided. However, as the number of auxiliary grooves 140 is increased, the dynamic pressure generating effects of herringbone grooves 130 is suppressed, and it is hence not necessary to increase the number of auxiliary grooves more than necessary.

Preferred Embodiment 2

Figure 6:
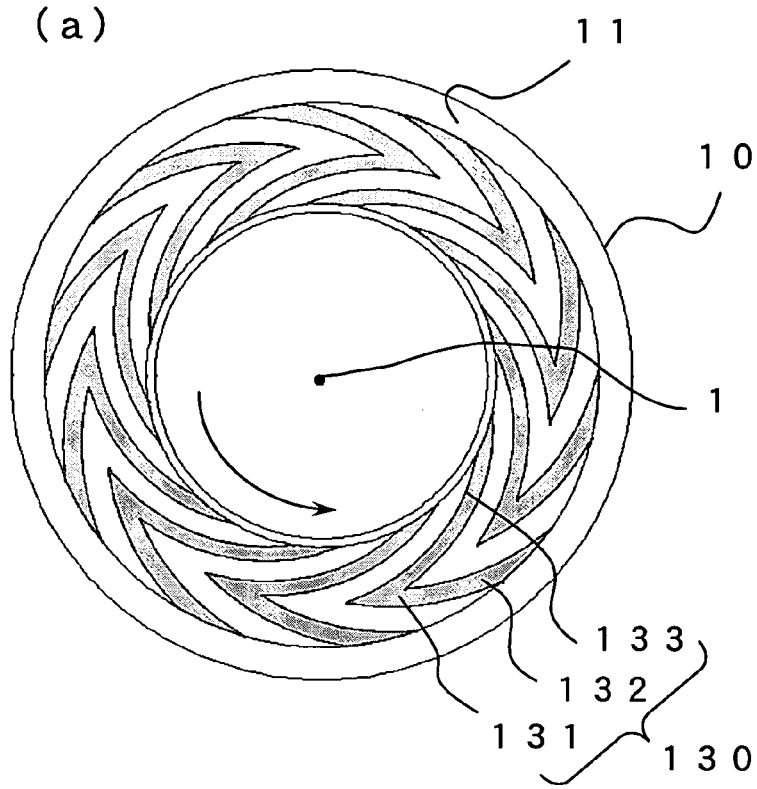
FIG. 6 (a) is a bearing surface diagram of a rotary side member of a thrust dynamic pressure bearing in preferred embodiment 2 of the invention.
Figure 6:
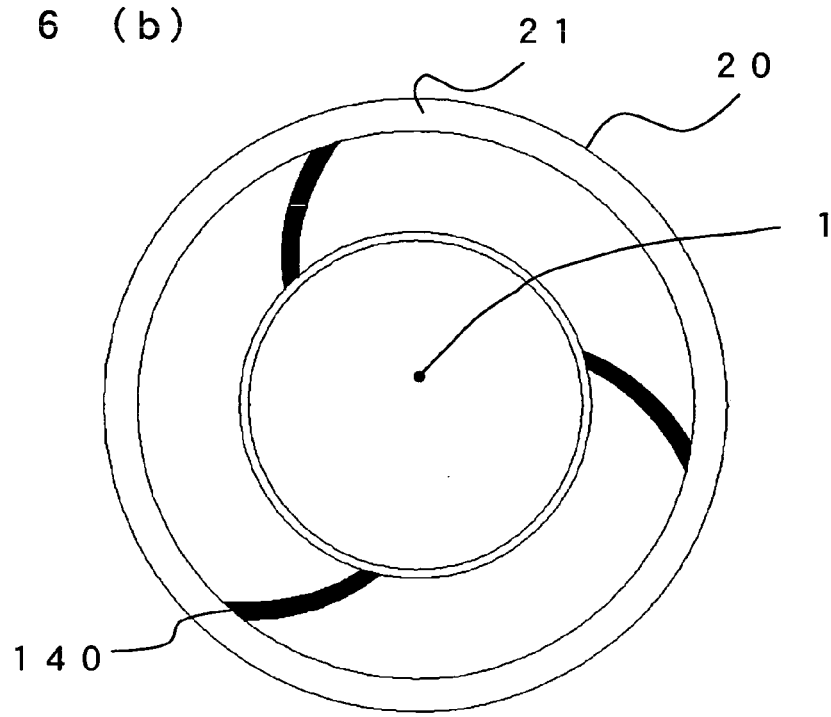
Figure 7:
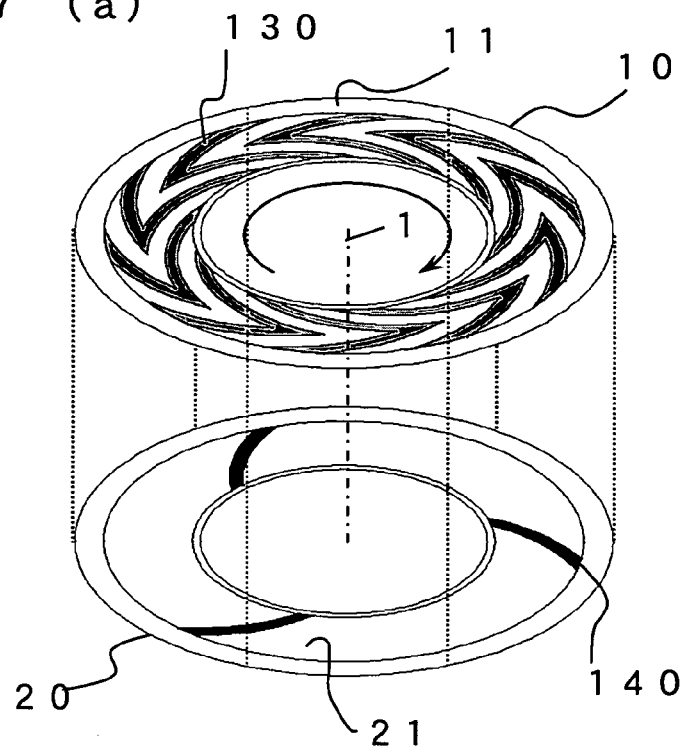
FIG. 7 (a) is a structural diagram of dynamic pressure generating grooves provided on a bearing surface of a bearing rotary side member, and an auxiliary groove provided on a bearing surface of a bearing fixed side member of the thrust dynamic pressure bearing in preferred embodiment 2 of the invention.
Figure 7:
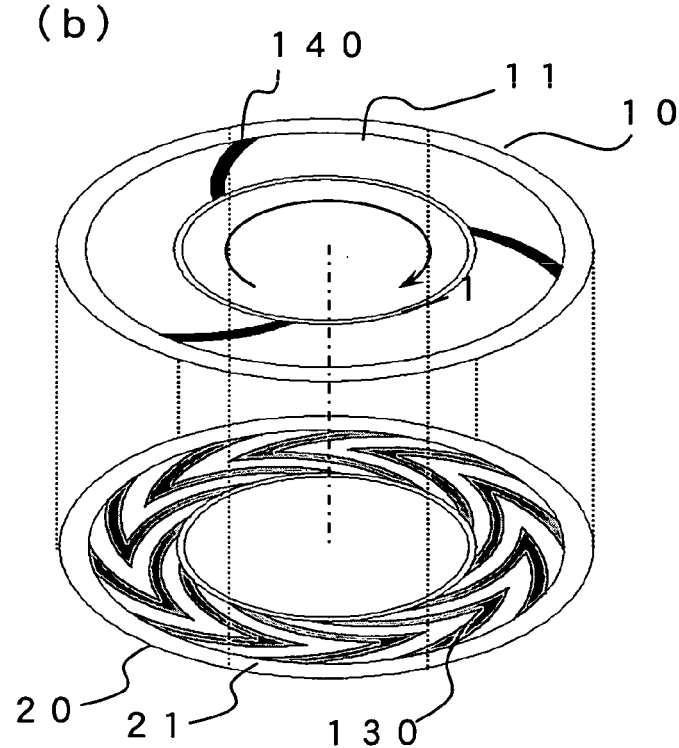
Figure 8:
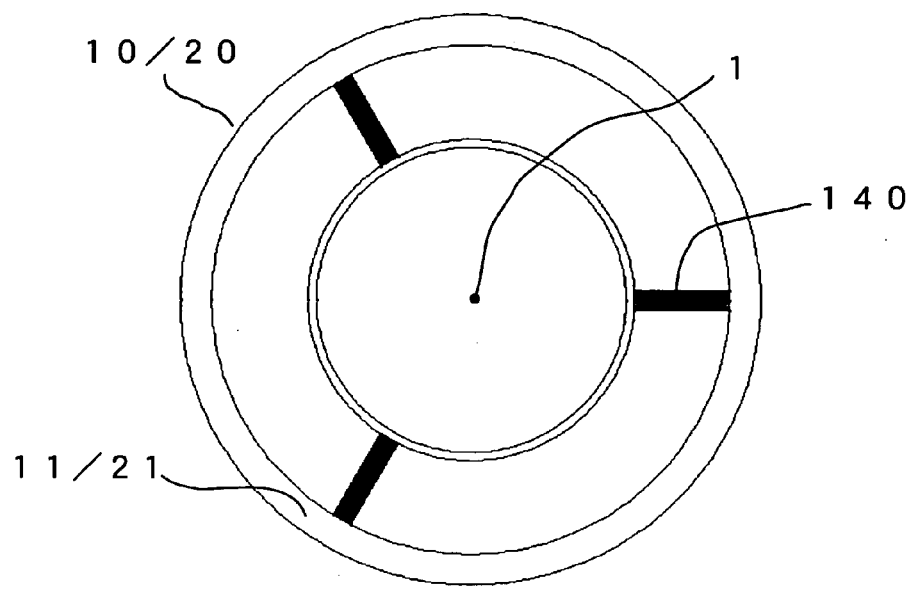
FIG. 8 (a) is a schematic diagram of the bearing surface of the bearing rotary side member or the bearing surface of the bearing fixed side member having a straight groove as the auxiliary groove of the thrust dynamic pressure bearing in preferred embodiment 2 of the invention.
Figure 8:
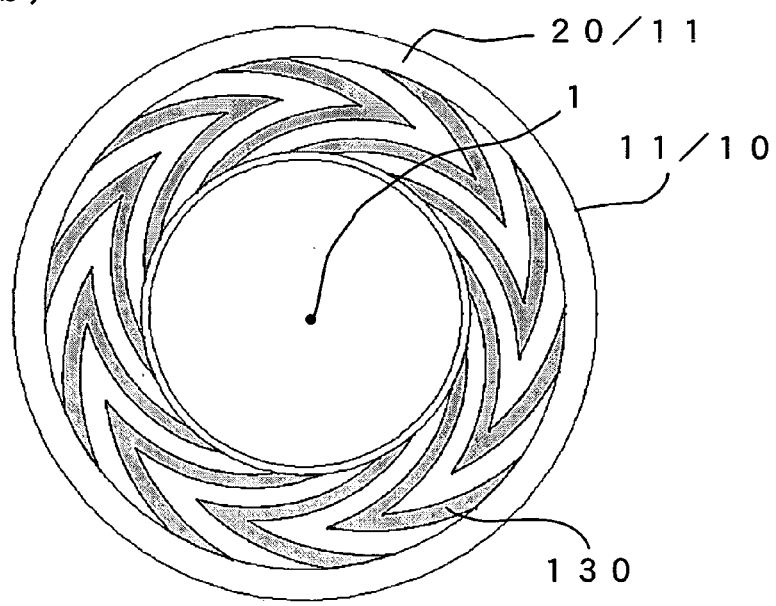

A thrust dynamic pressure bearing in preferred embodiment 2 of the invention is explained by referring to FIG. 6(a) to FIG. 8(b). FIG. 6 (a) is a bearing surface diagram of a rotary side member of a thrust dynamic pressure bearing in preferred embodiment 2 of the invention, and FIG. 6 (b) is a schematic diagram of a bearing surface of a fixed side member of a thrust dynamic pressure bearing in preferred embodiment 2 of the invention. FIG. 7 (a) is a structural diagram of forming dynamic pressure generating grooves on a bearing surface of a bearing rotary side member, and forming an auxiliary groove on a bearing surface of a bearing fixed side member of a thrust dynamic pressure bearing in preferred embodiment 2 of the invention. FIG. 7 (b) is a structural diagram of forming an auxiliary groove on a bearing surface of a bearing rotary side member, and forming dynamic pressure generating grooves on a bearing surface of a bearing fixed side member of a thrust dynamic pressure bearing in preferred embodiment 2 of the invention. FIG. 8 (a) is a schematic diagram of a bearing surface of a bearing rotary side member or a bearing surface of a bearing fixed side member having a straight groove as an auxiliary groove of a thrust dynamic pressure bearing in preferred embodiment 2 of the invention, and FIG. 8 (b) is a schematic diagram of a bearing surface of a bearing fixed side member or a bearing surface of a bearing rotary side member having a straight groove as an auxiliary groove of a thrust dynamic pressure bearing in preferred embodiment 2 of the invention.

In the thrust dynamic pressure bearing in preferred embodiment 2 of the invention shown in FIG. 6(a) to FIG. 7(b), auxiliary groove 140 for discharging bubbles staying in the bearing inner periphery is formed in bearing surface 11 of bearing rotary side member 10, or in bearing surface 21 of bearing fixed side member 20, and herringbone grooves 130 for generating dynamic pressure are formed in the opposing bearing surface 21 of bearing fixed side member 20, or bearing surface 11 of bearing rotary side member 10, which is different from the thrust dynamic pressure bearing in preferred embodiment 1 of the invention shown in FIG. 1, FIG. 2 and FIG. 4. Other basic configurations are the same, and explanation of duplicate parts is omitted. The same constituent elements as in FIG. 1 and FIG. 4 are identified with same reference numerals.

In FIG. 6(a) and FIG. 7(b), in the axial direction of rotation center axis 1, bearing surface 11 of bearing rotary side member 10 and bearing surface 21 of bearing fixed side member 20 are formed oppositely across a tiny gap filled with lubricating oil (not shown), and at the outer side of the tiny gap, a seal is provided for forming an air-liquid interface (not shown) of lubricating oil and air. As shown in FIG. 6 (a), plural herringbone grooves 130 having middle flex part 131 for generating dynamic pressure are formed on bearing surface 11 of bearing rotary side member 10 at a specified pitch in uniform intervals. Herringbone grooves 130 are formed in pump-in type so that the pressure of the bearing inner periphery may be higher than in the bearing outer periphery, and the position of middle flex part 131 is determined so that the area of radial outer section 132 from middle flex part 131 may be greater than the area of radial inner section 133.

Further, as shown in FIG. 6 (b), on bearing surface 21 of bearing fixed side member 20 opposite to bearing surface 11, several pump-in type spiral auxiliary grooves 140 are formed at specified pitch in uniform interval. Since spiral auxiliary grooves 140 are of pump-in type, auxiliary grooves 140 work to discharge bubbles in the lubricating oil from the inner periphery to the outer periphery, together with lubricating oil, in the thrust dynamic pressure generating parts. Moreover, auxiliary grooves 140 pulverize bubbles existing inside of the thrust dynamic pressure generating parts, and move the pulverized bubbles toward auxiliary grooves 140 and discharge the bubbles outside the thrust pressure generating parts by the difference in dynamic pressure generated in auxiliary grooves 140 and herringbone grooves 130.

The groove depth of auxiliary grooves 140 in the thrust dynamic pressure generating parts in preferred embodiment 2 of the invention cannot be directly explained by referring to FIG. 3 relating the groove depth of auxiliary groove 140 provided in the thrust dynamic pressure generating parts in preferred embodiment 1 of the invention, but may be considered as follows by reference to FIG. 3. That is, if the depth of auxiliary grooves 140 is less than 2 times of the depth of herringbone grooves 130, bubbles can be pulverized, but since the pressure difference of dynamic pressure generated in auxiliary grooves 140 and herringbone grooves 130 is small, it is hard to discharge bubbles If the depth of auxiliary grooves 140 is more than 6 times the depth of herringbone grooves 130, the pressure gradient of the inner periphery and the outer periphery is small, and the discharging effect of bubbles seems to be small. However, when the depth the auxiliary grooves 140 is in a range of 3 times to 5 times of depth of herringbone grooves 130, a sufficient dynamic pressure difference for moving pulverized bubbles from herringbone grooves 130 to auxiliary grooves 140 is obtained, and the pressure gradient of the inner periphery and the outer periphery is sufficiently large, and the discharging effect of bubbles seems to be great. Therefore, the groove depth of auxiliary grooves 140 provided in the thrust dynamic pressure generating parts in preferred embodiment 2 of the invention is also preferred to be 3 times to 5 times of the groove depth of herringbone grooves 130. If the groove width of auxiliary grooves 140 is narrower than herringbone grooves 130, the pump-in action is smaller, and if wider than herringbone grooves 130, the pressure difference of the generated dynamic pressure cannot be increased. Hence, the groove width of auxiliary grooves 140 is preferred to be nearly the same as that of herringbone grooves 130.

As described herein, in the thrust dynamic pressure bearing forming herringbone grooves 130 in rotary side bearing surface 11 and forming plural radial auxiliary grooves in the opposite fixed side bearing surface, the action and effect as mentioned above are obtained, and bubbles mixing in or staying in the lubricating oil can be securely discharged outside of the bearing. As compared with the conventional methods of forming radial grooves separately, extending part of plural dynamic pressure generating grooves, or expanding the width size in the peripheral direction in the thrust dynamic pressure generating parts of spiral type, the discharging effect of bubbles in the thrust dynamic pressure generating parts in preferred embodiment 2 of the invention is far greater, and the effect on the dynamic pressure generating action is smaller.

In the above explanation, as shown in FIG. 7 (a), herringbone grooves 130 are formed in bearing surface 11 of bearing rotary side member 10, and auxiliary grooves 140 are formed in bearing surface 21 of bearing fixed side member 20, but the thrust dynamic pressure bearing of preferred embodiment 2 of the invention is not limited to this configuration, and as shown in FIG. 7 (b), herringbone grooves 130 may be formed in bearing surface 21 of bearing fixed side member 20, and auxiliary grooves 140 may be formed in bearing surface 11 of bearing rotary side member 10.

Herein, auxiliary grooves 140 in the thrust dynamic pressure generating parts are of spiral shape, but as shown in FIG. 8, auxiliary grooves 140 may be formed as straight grooves. That is, herringbone grooves 130 are formed in bearing surface 11 of bearing rotary side member 10, or bearing surface 21 of bearing fixed side member 20, and straight auxiliary grooves 140 are formed in the opposite bearing surface 21 of bearing fixed side member 20, or bearing surface 11 of bearing rotary side member 10.

In the drawings used in the explanation above, three auxiliary grooves 140 are formed in the thrust dynamic pressure generating parts, but the invention is not limited to this number, and two or four auxiliary grooves 140 may be provided. However, preferably, the number of auxiliary grooves 140 should not be a common measure of the number of herringbone grooves 130, and as the number of auxiliary grooves 140 is increased, the dynamic pressure generating effect of herringbone grooves 130 is suppressed, and it is hence not necessary to increase the number of auxiliary grooves more than necessary.

Preferred Embodiment 3

Figure 9:
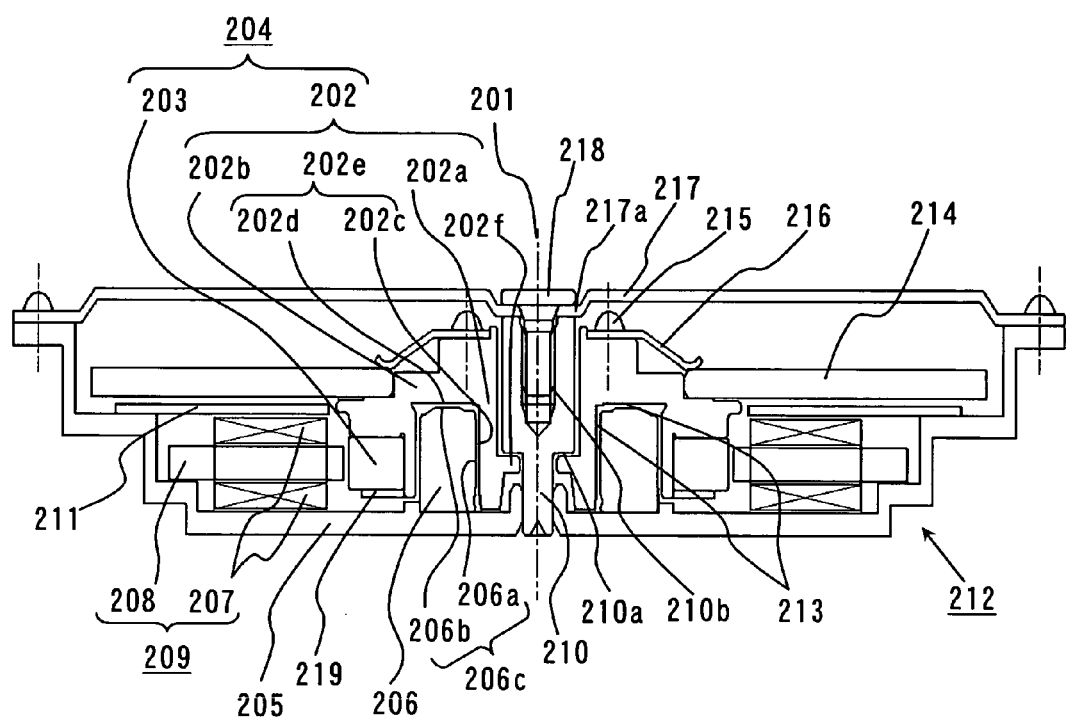
FIG. 9 is a schematic sectional view of principal parts of a spindle motor and information recording and reproducing apparatus using a thrust dynamic pressure bearing in preferred embodiment 3 of the invention.
Figure 10:
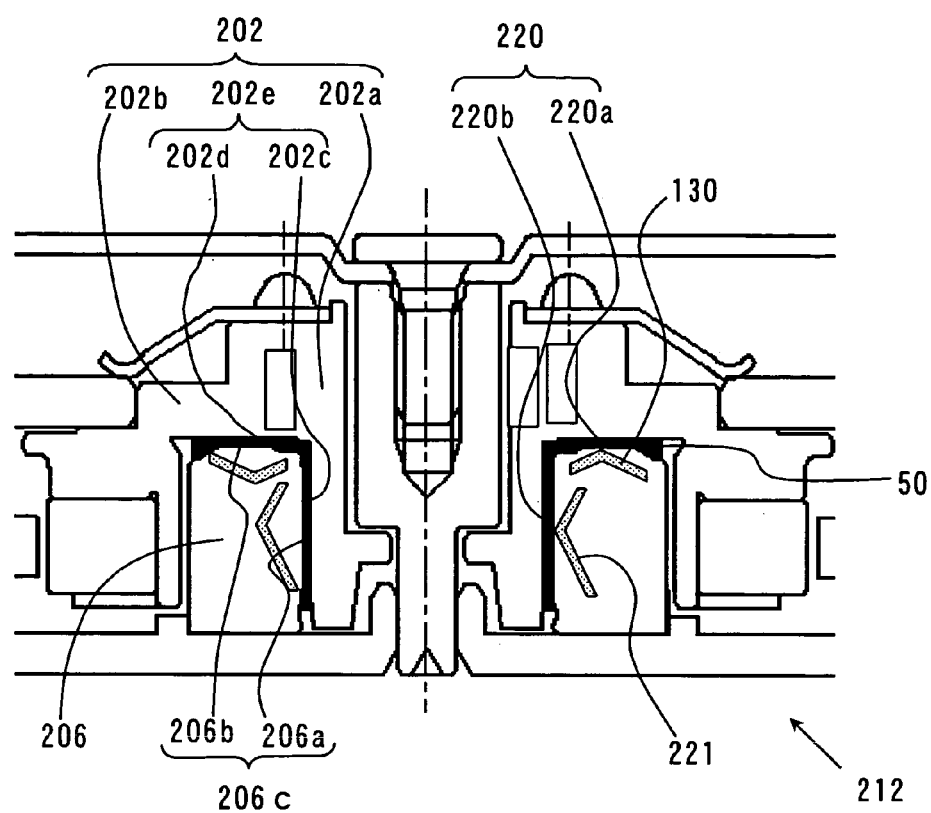
FIG. 10 is a magnified sectional view of the dynamic pressure bearing of a spindle motor in preferred embodiment 3 of the invention.
Figure 11:
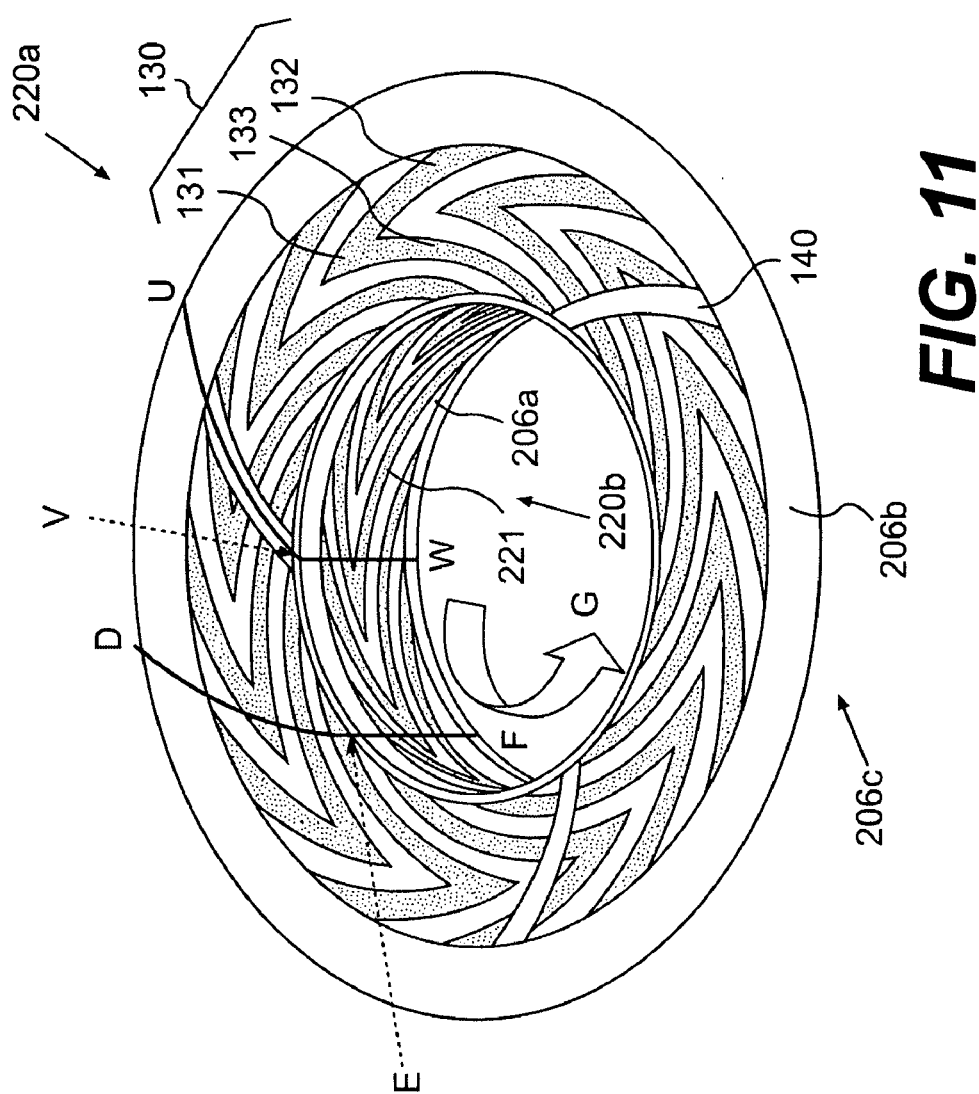
FIG. 11 is a perspective view of a structure of a fixed side bearing surface of the dynamic pressure bearing of the spindle motor in preferred embodiment 3 of the invention.
Figure 12:
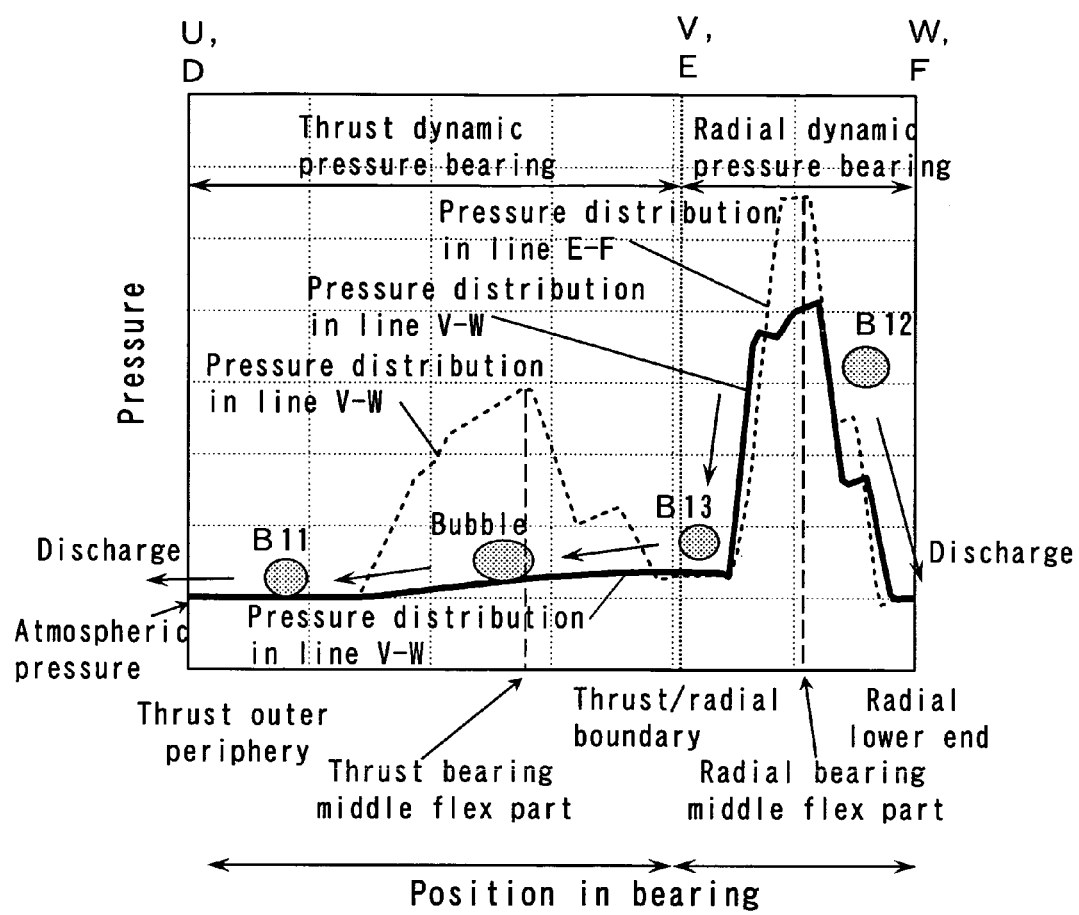
FIG. 12 is a pressure distribution diagram in a radial direction of the thrust dynamic pressure bearing and an axial direction of a radial dynamic pressure bearing of a thrust motor in preferred embodiment 3 of the invention.
Figure 13:
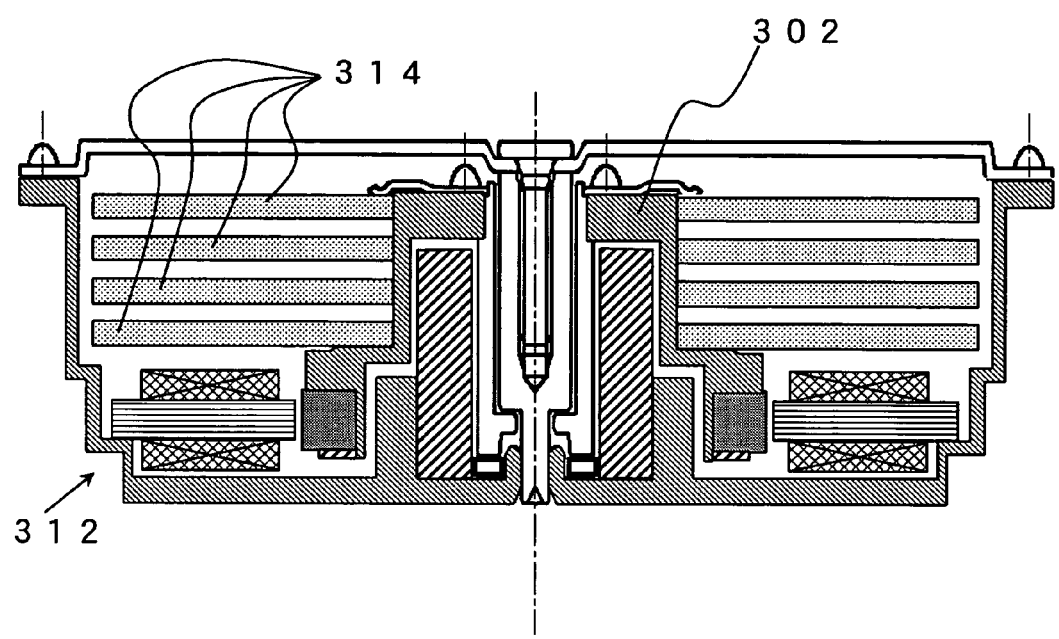
FIG. 13 is a schematic sectional view showing another example of the spindle motor and disk device in preferred embodiment 1 of the invention.

A spindle motor and an information recording and reproducing apparatus using a thrust dynamic pressure bearing are explained in preferred embodiment 3 of the invention by referring to FIG. 9 to FIG. 13. FIG. 9 is a schematic sectional view of principal parts of a spindle motor and an information recording and reproducing apparatus using a thrust dynamic pressure bearing in preferred embodiment 3 of the invention, FIG. 10 is a magnified sectional view of a dynamic pressure bearing of a spindle motor in preferred embodiment 3 of the invention, and FIG. 11 is a perspective view of a structure of a fixed side bearing surface of a dynamic pressure bearing of a spindle motor in preferred embodiment 3 of the invention. FIG. 12 is a pressure distribution diagram in a radial direction of a thrust dynamic pressure bearing and an axial direction of a radial dynamic pressure bearing of a thrust motor in preferred embodiment 3 of the invention, and FIG. 13 is a schematic sectional view showing another example of a spindle motor and disk device in preferred embodiment 3 of the invention. The information recording and reproducing apparatus shown herein is an example of an application of the invention in a disk device such as a hard disk drive, optical disk drive, or magneto-optical disk drive.

In FIG. 9, rotor 202 rotating about rotation center 201 has hollow cylindrical part 202a and flange 202b near rotation center 201. Rotor 202 also forms rotary side bearing 202e of the dynamic pressure bearing by outer periphery 202c of hollow cylindrical part 202a and lower end 202d of flange 202b. In the lower side of the portion projecting to the outer side of flange 202b of rotor 202, rotary magnet 203 magnetized in plural poles is affixed by press-fitting, adhesion or other known methods. Rotating element 204 is composed of rotor 202 and rotary magnet 203. The member for composing rotary side bearing 202e may be equivalent to bearing rotary side member 20 shown in the explanation of the thrust dynamic pressure bearing in preferred embodiments 1 and 2 of the invention.

The inner periphery of hollow cylindrical part 202a of rotor 202 for composing rotating element 204 has at least two different inside diameters, one diameter being larger at the upper side in FIG. 9 and the other diameter being smaller at the lower side (chassis 205 side). Step surface 202f for connecting the upper side inner periphery and lower side inner periphery forms a nearly vertical shape in the axial direction of rotation center 201. On the other hand, bearing fixed side member 206 is affixed to chassis 205 by press-fitting, adhering, welding or other known methods, and fixed side bearing 206c of dynamic pressure bearing is composed of inner periphery 206a opposed to outer periphery 202c of rotary side bearing 202e, and upper end 206b opposed to lower end 202d of rotary side bearing 202e. Coil 207 is wound about plural poles of stator core 208 to form stator 209. Stator 209 is affixed to chassis 205 so as to be opposite to the outer periphery of rotary magnet 203 affixed in rotor 202.

Fixed shaft 210, with its axial center coinciding nearly with rotation center 201, is affixed in chassis 205 by press-fitting, adhering or other methods, so as to keep a clearance to the outer periphery of fixed shaft 210 in the hollow portion at the inner side of hollow cylindrical part 202a composing rotor 202. Further, shield plate 211 for magnetically shielding the magnetic flux leak from stator 209 is affixed to chassis 205. Fixed shaft 210 has a stepped shaft shape, which is smaller in outside diameter at the lower side (chassis 205 side) in FIG. 9 and larger in outside diameter at the upper side. The outside diameter of the lower side portion of fixed shaft 210 is smaller than the inside diameter of the lower side portion of the inner periphery of cylindrical part 202a composing rotor 202, and the outside diameter of the upper side portion of fixed shaft 210 is formed smaller than the inside diameter of the upper side portion of rotor 202. Stepped surface 210a connecting the outer periphery of the smaller outside diameter in the lower side portion of fixed shaft 210 and the outer periphery of the larger outside diameter at the upper side forms a nearly vertical plane in the axial direction of rotation center 201. Fixed shaft 210 is fixed to chassis 205 so that step surface 202f for connecting the inner periphery of the upper side portion and the inner periphery of the lower side portion of hollow cylindrical part 202a for composing rotor 202, and stepped surface 210a of fixed shaft 210 may be opposite to each other across a tiny gap. Female threads 210b are formed in the central portion of the upper side end of fixed shaft 210. Spindle motor 212 is composed of these members.

On the top of the projecting portion from flange 202b composing rotor 202 of spindle motor 212, disk 214 forming a recording medium (not shown) on the surface by a known method is mounted, and disk 214 is pressed and fixed on the top of the projecting portion from flange 202b by an elastic force of disk holding member 216 fixed by screw 215, so that disk 214 is rotatable along rotation of rotor 202. Further, a signal converter (not shown) for recording and reproducing in the recording medium formed in disk 214 is disposed opposite to disk 214 by way of an oscillating means (not shown) for positioning the recording medium at a specified track position. The recording medium formed on disk 214 may also be formed on both sides of disk 214, and in this case the signal converter and oscillating means are composed to correspond to each recording medium formed on the upper and lower sides of disk 214.

Further, a through-hole is provided in abutting portion 217a in the middle of cover 217, corresponding to the position of female threads 210b of fixed shaft 210, and the lower end of abutting portion 217 abuts against the upper end of fixed shaft 210, and cover fixing screw 218 is fixed to female threads 210b of fixed shaft 210 by way of the through-hole of cover 217, thereby fixing cover 217 to fixed shaft 210. On the other hand, in the peripheral edge of cover 217, cover 217 is fixed and held on chassis 205 or casing (not shown) by setting a screw or the like. Thus, an information recording and reproducing apparatus is composed of disk 214, a signal converter, an oscillating means, spindle motor 212, cover 217, and other members. Needless to say, cover 217 and fixed shaft 210 may not be always fixed by screw.

The configuration of the dynamic pressure bearing of the spindle motor mentioned above is more specifically described below while referring to FIG. 10 and FIG. 11.

As shown in FIG. 10, the gap of mutually opposite surfaces of rotary side bearing 202e of rotor 202 and fixed side bearing 206c of bearing fixed side member 206 is filled with lubricating oil 50 such as ester synthetic oil. Radial dynamic pressure bearing 220b is composed between outer periphery 202c of hollow cylindrical part 202a composing rotor 202 and opposite inner periphery 206a of bearing fixed side member 206. Further, thrust dynamic pressure bearing 220a is composed between lower end 202d of flange 202b separately composing rotor 202, and opposite upper end 206b of bearing fixed side member 206.

Further, as shown in FIG. 11, radial dynamic pressure bearing 220b is composed of herringbone grooves 221 as dynamic pressure generating grooves formed in inner periphery 206a of bearing fixed side member 206, and smooth outer periphery 202c of hollow cylindrical part 202a opposite to inner periphery 206a. Herringbone grooves 221 are formed in a vertical asymmetrical shape that is longer in the lower side portion than the upper side portion of the middle flex part so as to pump out lubricating oil 50 toward thrust dynamic pressure bearing 220a by the pump-up effect during rotation of rotor 202.

On the other hand, thrust dynamic pressure bearing 220a is composed of herringbone grooves 130 as dynamic pressure generating grooves formed in upper end 206b of bearing fixed side member 206, and smooth lower end 202d of flange 202b opposite to the upper end. Herringbone grooves 130 of thrust dynamic pressure bearing 220a are determined in the position of middle flex part 131 so that the area of radial outer section 132 may be greater than the area of radial inner section 133 so as to pump out lubricating oil 50 toward radial dynamic pressure bearing 220b by the pump effect during rotation of rotor 202.

Further, on the same upper end 206b, at least one pump-in type spiral auxiliary groove 140 for discharging bubbles is formed away from middle flex part 131 so as not to interfere with middle flex part 131 of herringbone grooves 130. FIG. 11 shows three auxiliary grooves 140, and when two or more auxiliary grooves 140 are formed, the auxiliary grooves 140 are provided at a specified pitch in uniform interval. As explained already by referring to FIG. 3, the groove depth of auxiliary grooves 140 is 3 times to 5 times the groove depth of herringbone grooves 130, and the groove width is preferred to be similar to that of herringbone grooves 130.

In dynamic pressure bearing 220 of spindle motor 212 thus composed, when rotary side bearing 202e of rotor 202 rotates in the direction of arrow G in FIG. 11, the pressure distribution is as shown in FIG. 12, in line U-V-W passing through auxiliary grooves 140 provided away from middle flex part 131 of herringbone grooves 140 of thrust dynamic pressure bearing 220a shown in FIG. 11, drawn in an axial direction vertical to herringbone grooves 221 of radial bearing 220b, and line D-E-F passing through middle flex part 131 of herringbone grooves 140 of thrust dynamic pressure bearing 220a, drawn in an axial direction vertical to herringbone grooves 221 of radial bearing 220b.

In FIG. 11 and FIG. 12, in thrust dynamic pressure bearing 220a, since the lubricating oil flows toward middle flex part 131 along radial outer section 132 and radial inner section 133 of herringbone grooves 130, a pressure peak of maximum dynamic pressure appears in middle flex part 131, and the pressure distribution in bearing radial section is a mountain-like profile (line D-E) reaching the peak near middle flex part 131 and descending toward the bearing outer periphery and the bearing inner periphery. In radial dynamic pressure bearing 220b, similarly, a pressure peak of maximum dynamic pressure appears in the middle flex part of herringbone grooves 221, and the pressure distribution in the axial section is a mountain-like profile (line E-F) reaching the peak near the middle flex part and descending toward the bearing upper side and the bearing lower side.

At this time, since herringbone grooves 130 of thrust dynamic pressure bearing 220a are of so-called pump-in type, that is, the area of radial outer section 132 from middle flex part 131 is greater than the area of inner section 133, the lubricating oil is pumped out to the inner peripheral side, that is, toward radial dynamic pressure bearing 220b. Besides, since herringbone grooves 221 of radial dynamic pressure bearing 220b are of so-called pump-up type of vertical asymmetric shape, that is, the lower side is longer than the upper side of the middle flex part, the lubricating oil is pumped out to the upper side, that is, toward thrust dynamic pressure bearing 220a. Accordingly, lubricating oil 50 is always pumped out to the inside of dynamic pressure bearing 220 by thrust dynamic pressure bearing 220a and radial dynamic pressure bearing 220b, and the pressure in boundary portion (E) of thrust dynamic pressure bearing 220a and radial dynamic pressure bearing 220b is higher than the pressure in outer periphery (D) of thrust dynamic pressure bearing 220a and lower end (F) of radial dynamic pressure bearing 220b. By this action, lubricating oil 50 will not flow out of the bearing from the air-liquid interface of outer periphery of thrust dynamic pressure bearing 220a and the lower end of radial dynamic pressure bearing 220b.

On the other hand, since the groove depth of auxiliary grooves 140 formed in thrust dynamic pressure bearing 220a is deeper than herringbone grooves 130 for generating dynamic pressure, if rotor 202 rotates, dynamic pressure is hardly generated in auxiliary grooves 140, and the internal pressure of auxiliary grooves 140 shows a pressure distribution (line U-V) slowly descending toward the outer periphery of thrust dynamic pressure bearing 220a from the boundary portion of thrust dynamic pressure bearing 220a and radial dynamic pressure bearing 220b elevated in pressure by the pump-in action of thrust dynamic pressure bearing 220a and pump-up action of radial dynamic pressure bearing 220b.

If bubbles mix in lubricating oil, in the region of thrust dynamic pressure bearing 220a free from auxiliary grooves 140, the pressure distribution is the same as line D-E-F, that is, a profile having a pressure peak at two positions near middle flex part 131 of herringbone grooves 130 of thrust dynamic pressure bearing 220a and near the middle flex part of herringbone grooves 221 of radial dynamic pressure bearing 220b, and therefore bubbles B11, B12 existing outside of the middle flex part of the herringbone grooves of each dynamic pressure bearing are moved to the outside of dynamic pressure bearing 220 along the pressure gradient of dynamic pressure, and discharged from the air-liquid interface. However, bubbles B13 existing inside of the middle flex part of the herringbone grooves are enclosed by two pressure peaks, and cannot be moved to the outside by surpassing the pressure peaks, and are hence collected in the boundary portion of thrust dynamic pressure bearing 220a and radial dynamic pressure bearing 220b.

However, inside of auxiliary grooves 140 of thrust dynamic pressure bearing 220a, since the pressure distribution is descending slightly from the boundary portion of thrust dynamic pressure bearing 220a and radial dynamic pressure bearing 220b, toward the outer periphery of thrust dynamic pressure bearing 220a, bubbles B13 gathering in the boundary portion of the two bearings are moved to the outer periphery of thrust dynamic pressure bearing 220a through auxiliary grooves 140, and are discharged outside of the bearing from the air-liquid interface.

Therefore, by adding auxiliary grooves 140 crossing in the radial direction so as not to pass middle flex part 131 of herringbone grooves 130 provided in the thrust dynamic pressure generating parts of spindle motor 212 in preferred embodiment 3 of the invention, bubbles mixing or staying in the lubricating oil can be securely discharged outside of the bearing, and lubricating oil leak due to bubbles can be prevented, and a spindle motor of high reliability and durability is realized. By using spindle motor 212 having such dynamic pressure bearing 220, an information recording and reproducing apparatus such as a disk drive having high reliability and durability can be realized.

Since auxiliary grooves 140 of herringbone grooves 130 are provided away from middle flex part 131 so as not to interfere with middle flex part 131, effects on dynamic pressure generating action are kept to a minimum limit, and hence as compared with the methods of forming radial grooves separately, extending part of plural dynamic pressure generating grooves, or expanding the width size in the peripheral direction in order to discharge bubbles generated and staying in the thrust dynamic pressure generating parts of conventional spiral type, the dynamic pressure generating capacity of the thrust dynamic pressure generating parts in preferred embodiment 3 of the invention is far greater. That is, thrust dynamic pressure bearing 220a having herringbone grooves has the pressure peak in middle flex part 131 of herringbone grooves 130, and the pressure peak appearing radius is greater as compared with the thrust dynamic pressure bearing having the pressure peak in the innermost periphery of the bearing, and the rotation rigidity to deflection of rotation of shaft is higher than in the thrust dynamic pressure bearing having spiral grooves. Hence, the radial length of radial dynamic pressure bearing 220b can be shortened, spindle motor 212 can be reduced in thickness, and further the disk device and information recording and reproducing apparatus can be reduced in thickness.

In the foregoing explanation, radial dynamic pressure bearing 220b of spindle motor 212 in preferred embodiment 3 of the invention is composed of fixed side bearing 206c by forming herringbone grooves 221 as dynamic pressure generating grooves in inner periphery 206a of bearing fixed side member 206, and smooth outer periphery 202c of hollow cylindrical part 202a of rotor 202 as rotary side bearing 202e, but not limited to this example, inner periphery 206a of bearing fixed side member 206 may be formed as fixed side bearing 206c directly in its smooth surface, and herringbone grooves 221 as dynamic pressure generating grooves may be formed in outer periphery 202c of hollow cylindrical part 202a of rotor 202 to be used as rotary side bearing 202e.

Further, as explained above, thrust dynamic pressure bearing 220a is formed as fixed side bearing 206c by forming herringbone grooves 130 as dynamic pressure generating grooves and auxiliary grooves 140 for discharging bubbles on upper end 206b of bearing fixed side member 206, and smooth lower end 202d of flange 202b is formed as rotary side bearing 202e, but not limited to this example, in the thrust dynamic pressure bearing in preferred embodiment 1 of the invention, as explained in FIG. 4 (a), upper end 206b of bearing fixed side member 206 may be formed as fixed side bearing 206c directly in its smooth surface, and herringbone grooves 130 as dynamic pressure generating grooves and auxiliary grooves 140 for discharging bubbles may be formed in lower end 202d of flange 202b, so that rotary side bearing 202e may be formed. Further, in the thrust dynamic pressure bearing in preferred embodiment 2 of the invention, as explained in FIG. 7 (a), herringbone grooves 130 as dynamic pressure generating grooves may be formed in lower end 202d of flange 202b to be used as rotary side bearing 202e, and auxiliary grooves 140 for discharging bubbles may be formed in upper end 206b of bearing fixed side member 206 to be used as fixed side bearing 206c, or further as explained in FIG. 7 (b), auxiliary grooves 140 for discharging bubbles may be formed in lower end 202d of flange 202b to be used as rotary side bearing 202e, and herringbone grooves 130 as dynamic pressure generating grooves may be formed in upper end 206b of bearing fixed side member 206 to be used as fixed side bearing 206c.

Further, auxiliary grooves 140 for discharging bubbles provided in the thrust dynamic pressure generating parts in the spindle motor in preferred embodiment 3 of the invention may be formed in pump-in type spiral shape, or auxiliary grooves 140 may be formed as straight grooves as shown in FIGS. 5(a) and (b) or FIGS. 8(a) and (b).

In FIG. 11 used in the explanation above, three auxiliary grooves 140 are formed in the thrust dynamic pressure generating parts, but the invention is not limited to this number, and one, two or four auxiliary grooves 140 may be provided. However, as the number of auxiliary grooves 140 is increased, the dynamic pressure generating effect of herringbone grooves 130 is suppressed, and hence it is not necessary to increase the number of auxiliary grooves more than necessary.

In preferred embodiment 3 of the invention, the spindle motor mounting one disk, and information recording and reproducing apparatus such as a disk device are explained, but as shown in FIG. 13, by a known method, by mounting spindle motor 312 by designing so as to mount plural disks 314 on rotor 302, it is also possible to compose disk device or other information recording and reproducing apparatus mounting a plurality of disks 314.

The thrust dynamic pressure bearing of the invention has high reliability and durability, free from risk of leak of lubricating oil, and the spindle motor having this thrust dynamic pressure bearing can be usefully applied in a hard disk drive and other information recording and reproducing apparatus.

What is claimed is:

1. A thrust dynamic pressure bearing, comprising:
   a bearing rotary side member having a first bearing surface;
   a bearing fixed side member having a second bearing surface, said first and second bearing surfaces being mutually opposed to each other across a gap in an axial direction, said gap being filled with lubricating oil;
   herringbone dynamic pressure generating grooves provided in one of said first and second bearing surfaces such that dynamic pressure of said lubricating oil is induced upon rotation of said bearing rotary side member relative to said bearing fixed side member, each of said herringbone dynamic pressure generating grooves having a middle flex part, said one of said first and second bearing surfaces constituting a pressure generating groove surface, and the other of said first and second bearing surfaces constituting a groove-facing surface; and
   at least one auxiliary groove provided in one of said pressure generating groove surface and said groove-facing surface, said at least one auxiliary groove communicating from an inner periphery of said one of said pressure generating groove surface and said groove-facing surface to an outer periphery of said one of said pressure generating groove surface and said groove-facing surface.

2. The thrust dynamic pressure bearing of claim 1, wherein a depth of said at least one auxiliary groove is greater than that of said herringbone dynamic pressure generating grooves.

3. The thrust dynamic pressure bearing of claim 2, wherein the depth of said at least one auxiliary groove is 3 to 5 times the depth of said herringbone dynamic pressure generating grooves.

4. The thrust dynamic pressure bearing of claim 2, wherein said at least one auxiliary groove has a pump-in spiral groove shape.

5. The thrust dynamic pressure bearing of claim 2, wherein said at least one auxiliary groove is straight.

6. The thrust dynamic pressure bearing of claim 1, wherein each of said herringbone dynamic pressure generating grooves has a radial outer section extending from said middle flex part to an outer periphery of said one of said first and second bearing surfaces, and a radial inner section extending from said middle flex part to an inner periphery of said one of said first and second bearing surfaces, and an area of said radial outer section is greater than that of said radial inner section.

7. The thrust dynamic pressure bearing of claim 6, wherein said at least one auxiliary groove has a pump-in spiral groove shape.

8. The thrust dynamic pressure bearing of claim 6, wherein said at least one auxiliary groove is straight.

9. The thrust dynamic pressure bearing of claim 1, wherein said herringbone dynamic pressure generating grooves and said at least one auxiliary groove are both provided in said second bearing surface of said bearing fixed side member.

10. The thrust dynamic pressure bearing of claim 9, wherein said at least one auxiliary groove is positioned such that said at least one auxiliary groove does not intersect said middle flex part of any of said herringbone dynamic pressure generating grooves.

11. The thrust dynamic pressure bearing of claim 9, wherein said at least one auxiliary groove has a pump-in spiral groove shape.

12. The thrust dynamic pressure bearing of claim 9, wherein said at least one auxiliary groove is straight.

13. The thrust dynamic pressure bearing of claim 1, wherein said herringbone dynamic pressure generating grooves and said at least one auxiliary groove are both provided in said first bearing surface of said bearing rotary side member.

14. The thrust dynamic pressure bearing of claim 13, wherein said at least one auxiliary groove is positioned such that said at least one auxiliary groove does not intersect said middle flex part of any of said herringbone dynamic pressure generating grooves.

15. The thrust dynamic pressure bearing of claim 13, wherein said at least one auxiliary groove has a pump-in spiral groove shape.

16. The thrust dynamic pressure bearing of claim 13, wherein said at least one auxiliary groove is straight.

17. The thrust dynamic pressure bearing of claim 1, wherein said herringbone dynamic pressure generating grooves are provided in said first bearing surface of said bearing rotary side member, and said at least one auxiliary groove is provided in said second bearing surface of said bearing fixed side member.

18. The thrust dynamic pressure bearing of claim 17, wherein said at least one auxiliary groove has a pump-in spiral groove shape.

19. The thrust dynamic pressure bearing of claim 17, wherein said at least one auxiliary groove is straight.

20. The thrust dynamic pressure bearing of claim 1, wherein said herringbone dynamic pressure generating grooves are provided in said second bearing surface of said bearing fixed side member, and said at least one auxiliary groove is provided in said first bearing surface of said bearing rotary side member.

21. The thrust dynamic pressure bearing of claim 20, wherein said at least one auxiliary groove has a pump-in spiral groove shape.

22. The thrust dynamic pressure bearing of claim 20, wherein said at least one auxiliary groove is straight.

23. The thrust dynamic pressure bearing of claim 1, wherein said at least one auxiliary groove has a pump-in spiral groove shape.

24. The thrust dynamic pressure bearing of claim 1, wherein said at least one auxiliary groove is straight.

25. The thrust dynamic pressure bearing of claim 1, wherein each of said herringbone dynamic pressure generating grooves has a radial outer section extending from said middle flex part to an outer periphery of said one of said first and second bearing surfaces, and a radial inner section extending from said middle flex part to an inner periphery of said one of said first and second bearing surfaces.

26. The thrust dynamic pressure bearing of claim 1, wherein said at least one auxiliary groove extends continuously straight from said inner periphery to said outer periphery of said one of said pressure generating groove surface and said groove-facing surface.

27. The thrust dynamic pressure bearing of claim 1, wherein said bearing rotary side member is arranged for rotation in a rotation direction; and
said at least one auxiliary groove extends from said inner periphery to said outer periphery of said one of said pressure generating groove surface and said groove-facing surface so as to continuously have a directional component in said rotation direction.

28. A spindle motor, comprising:
a rotor having a hollow cylindrical portion and a flange radially extending from said hollow cylindrical portion, said hollow cylindrical portion being rotatable about a fixed shaft;
a rotary magnet affixed to an outer periphery of said flange;
a stator affixed to a chassis so as to be opposed to said rotary magnet, said stator having a coil;
an annular fixed side bearing member having an inner periphery opposed to an outer periphery of said hollow cylindrical portion, and said annular fixed side bearing member having an upper surface opposed to a lower surface of said flange across a gap so as to form a thrust dynamic pressure bearing portion, said gap being filled with lubricating oil;
herringbone dynamic pressure generating grooves provided in one of said upper surface of said fixed side bearing member and said lower surface of said flange such that dynamic pressure of said lubricating oil is induced upon rotation of said rotor relative to said annular fixed side bearing member, each of said herringbone dynamic pressure generating grooves having a middle flex part, said one of said upper surface of said fixed side bearing member and said lower surface of said flange constituting a pressure generating groove surface, and the other of said upper surface of said fixed side bearing member and said lower surface of said flange constituting a groove-facing surface; and
at least one auxiliary groove provided in one of said pressure generating groove surface and said groove-facing surface, said at least one auxiliary groove communicating from an inner periphery of said one of said pressure generating groove surface and said groove-facing surface to an outer periphery of said one of said pressure generating groove surface and said groove-facing surface.

29. The spindle motor of claim 28, wherein said at least one auxiliary groove has a depth greater than that of said herringbone dynamic pressure generating grooves.

30. The spindle motor of claim 29, wherein the depth of said at least one auxiliary groove is 3 to 5 times the depth of said herringbone dynamic pressure generating grooves.

31. The spindle motor of claim 29, wherein said at least one auxiliary groove has a pump-in spiral groove shape.

32. The spindle motor of claim 29, wherein said at least one auxiliary groove is straight.

33. The spindle motor of claim 28, wherein said at least one auxiliary groove has a pump-in spiral groove shape.

34. The spindle motor of claim 28, wherein each of said herringbone dynamic pressure generating grooves has a radial outer section extending from said middle flex part to an outer periphery of said one of said upper surface of said fixed side bearing member and said lower surface of said flange, and a radial inner section extending from said middle flex part to an inner periphery of said one of said upper surface of said fixed side bearing member and said lower surface of said flange.

35. The spindle motor of claim 28, wherein said herringbone dynamic pressure generating grooves and said at least one auxiliary groove are both provided in one of said upper surface of said fixed side bearing member and said lower surface of said flange.

36. The spindle motor of claim 28, wherein said at least one auxiliary groove is provided in said groove facing surface.

37. The spindle motor of claim 28, wherein said at least one auxiliary groove extends continuously straight from said inner periphery to said outer periphery of said one of said pressure generating groove surface and said groove-facing surface.

38. The spindle motor of claim 28, wherein said rotor is arranged for rotation in a rotation direction; and
said at least one auxiliary groove extends from said inner periphery to said outer periphery of said one of said pressure generating groove surface and said groove-facing surface so as to continuously have a directional component in said rotation direction.

39. An information recording and/or reproducing apparatus, comprising:
a disk;
a signal converter for recording and/or reproducing in recording medium formed in the disk;
oscillating means for positioning said signal converter at a specified track position; and
a spindle motor having
a rotor having a hollow cylindrical portion and a flange radially extending from said hollow cylindrical portion, said hollow cylindrical portion being rotatable about a fixed shaft;
a rotary magnet affixed to an outer periphery of said flange;

a stator affixed to a chassis so as to be opposed to said rotary magnet, said stator having a coil;

an annular fixed side bearing member having an inner periphery opposed to an outer periphery of said hollow cylindrical portion, and said annular fixed side bearing member having an upper surface opposed to a lower surface of said flange across a gap so as to form a thrust dynamic pressure bearing portion, said gap being filled with lubricating oil;

herringbone dynamic pressure generating grooves provided in one of said upper surface of said fixed side bearing member and said lower surface of said flange such that dynamic pressure of said lubricating oil is induced upon rotation of said rotor relative to said annular fixed side bearing member, each of said herringbone dynamic pressure generating grooves having a middle flex part, said one of said upper surface of said fixed side bearing member and said lower surface of said flange constituting a pressure generating groove surface, and the other of said upper surface of said fixed side bearing member and said lower surface of said flange constituting a groove-facing surface; and at least one auxiliary groove provided in one of said pressure generating groove surface and said groove-facing surface, said at least one auxiliary groove communicating from an inner periphery of said one of said pressure generating groove surface and said groove-facing surface to an outer periphery of said one of said pressure generating groove surface and said groove-facing surface.

40. The information recording and/or reproducing apparatus of claim 39, wherein said at least one auxiliary groove has a depth greater than that of said herringbone dynamic pressure generating grooves.

41. The information recording and/or reproducing apparatus of claim 40, wherein the depth of said at least one auxiliary groove is 3 to 5 times the depth of said herringbone dynamic pressure generating grooves.

42. The information recording and/or reproducing apparatus of claim 40, wherein said at least one auxiliary groove has a pump-in spiral groove shape.

43. The information recording and/or reproducing apparatus of claim 40, wherein said at least one auxiliary groove has a pump-in spiral groove shape.

44. The information recording and/or reproducing apparatus of claim 39, wherein said at least one auxiliary groove has a pump-in spiral groove shape.

45. The information recording and/or reproducing apparatus of claim 39, wherein each of said herringbone dynamic pressure generating grooves has a radial outer section extending from said middle flex part to an outer periphery of said one of said upper surface of said fixed side bearing member and said lower surface of said flange, and a radial inner section extending from said middle flex part to an inner periphery of said one of said upper surface of said fixed side bearing member and said lower surface of said flange.

46. The information recording and/or reproducing apparatus of claim 39, wherein said herringbone dynamic pressure generating grooves and said at least one auxiliary groove are both provided in one of said upper surface of said fixed side bearing member and said lower surface of said flange.

47. The information recording and/or reproducing apparatus of claim 39, wherein said at least one auxiliary groove is provided in said groove facing surface.

48. The information recording and/or reproducing apparatus of claim 39, wherein said at least one auxiliary groove extends continuously straight from said inner periphery to said outer periphery of said one of said pressure generating groove surface and said groove-facing surface.

49. The information recording and/or reproducing apparatus of claim 39, wherein said bearing rotary side member is arranged for rotation in a rotation direction; and said at least one auxiliary groove extends from said inner periphery to said outer periphery of said one of said pressure generating groove surface and said groove-facing surface so as to continuously have a directional component in said rotation direction.

* * * * *